(12) United States Patent
Goldman-Shenhar et al.

(10) Patent No.: US 11,934,957 B2
(45) Date of Patent: Mar. 19, 2024

(54) METHODS, SYSTEMS, AND APPARATUSES FOR USER-UNDERSTANDABLE EXPLAINABLE LEARNING MODELS

(71) Applicant: GM GLOBAL TECHNOLOGY OPERATIONS LLC, Detroit, MI (US)

(72) Inventors: Claudia V. Goldman-Shenhar, Mevasseret Zion (IL); Michael Baltaxe, Raanana (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 854 days.

(21) Appl. No.: 17/023,515

(22) Filed: Sep. 17, 2020

(65) Prior Publication Data
US 2022/0067511 A1 Mar. 3, 2022

Related U.S. Application Data

(60) Provisional application No. 63/071,135, filed on Aug. 27, 2020.

(51) Int. Cl.
*G06N 3/08* (2023.01)
*G06N 3/0464* (2023.01)
(Continued)

(52) U.S. Cl.
CPC ............ *G06N 3/082* (2013.01); *G06N 3/0464* (2023.01); *G06V 30/274* (2022.01)

(58) Field of Classification Search
CPC ...... G06N 3/082; G06N 3/0464; G06N 3/045; G06N 3/044; G06N 3/08; G06N 20/00;
(Continued)

(56) References Cited

U.S. PATENT DOCUMENTS

2021/0117778 A1* 4/2021 Doumbouya .......... G06N 3/045
2021/0237759 A1* 8/2021 Wray ................. B60W 60/0011
2022/0172146 A1* 6/2022 Zillner ...................... G06N 3/08

OTHER PUBLICATIONS

Deo N. and Trivedi M. 2018. Convolutional Social Pooling for Vehicle Trajectory Prediction. In Proceedings of the IEEE Conference on Computer Vision and Pattern Recognition (CVPR) Workshops.
(Continued)

*Primary Examiner* — Dave Misir
(74) *Attorney, Agent, or Firm* — Lorenz & Kopf LLP

(57) ABSTRACT

Methods, systems, and apparatuses to build an explainable user output to receive input feature data by a neural network of multiple layers of an original classifier; determine a semantic function to label data samples with semantic categories; determine a semantic accuracy for each layer of the original classifier within the neural network; compare each layer based on results from the comparison of the semantic accuracy; designate a layer based on an amount of computed semantic accuracy; extend the designated layer by a category branch to the neural network to extract semantic data samples from the semantic content to train a set of new connections of an explainable classifier to compute a set of output explanations with an accuracy measure associated each output explanation for each semantic category of the plurality of semantic categories, and compare the accuracy measure for each output explanation to generate the output explanation in a user understandable format.

20 Claims, 11 Drawing Sheets

(51) Int. Cl.
*G06N 3/082* (2023.01)
*G06V 30/262* (2022.01)

(58) Field of Classification Search
CPC ...... G06V 30/274; G06V 10/82; G06V 20/56; G05D 2201/0213; G05D 1/0088; G06F 18/214; G06F 18/241
See application file for complete search history.

(56) References Cited

OTHER PUBLICATIONS

Huang S. H., Bhatia K., Abbeel P. and Dragan A. D., 2018. "Establishing Appropriate Trust via Critical States," IEEE/RSJ International Conference on Intelligent Robots and Systems (IROS), Madrid, 2018, pp. 3929-3936.

Goldman C.V., Hartounian A., Mergui R. and Kraus S. 2020. Adaptive Driving Agent. To appear In Proceedings of the 8th International Conference on Human-Agent Interaction. Sydney (online), Australia.

Krizhevsky A., Sutskever I. and Hinton G. E. 2012. Imagenet Classification with Deep Convolutional Neural Networks. In Proceedings of the 25th International Conference on Neural Information Processing Systems 1: 1097-1105.

LeCun Y., Bottou L., Bengio Y. and Haffner P. 1998. Gradient-based Learning Applied to Document Recognition. In Proceedings of the IEEE 86 (11): 2278-2324.

Ribeiro M., Singh S. and Guestrin C. 2016. "Why should I trust you? Explaining the predictions of any classifier". In Proceedings of ACM SIGKDD International Conference on Knowledge Discovery and Data Mining (KDD).

Dos Santos Silva V., Freitas A. and Handschuh S. 2019. On the Semantic Interpretability of Artificial Intelligence Models. http://arxiv.org/abs/1907.04105.

* cited by examiner

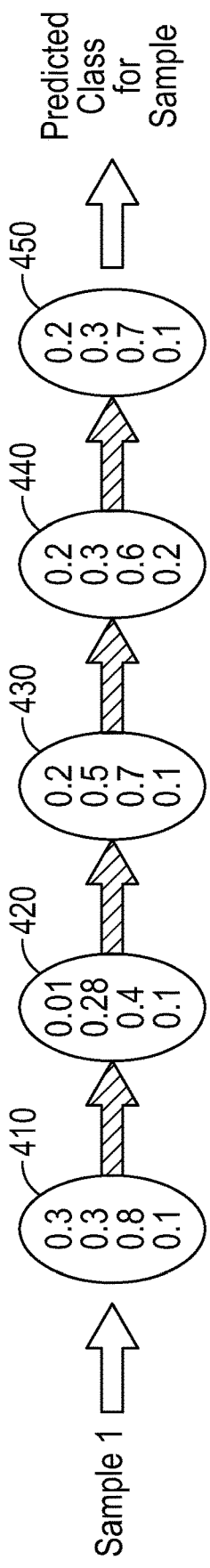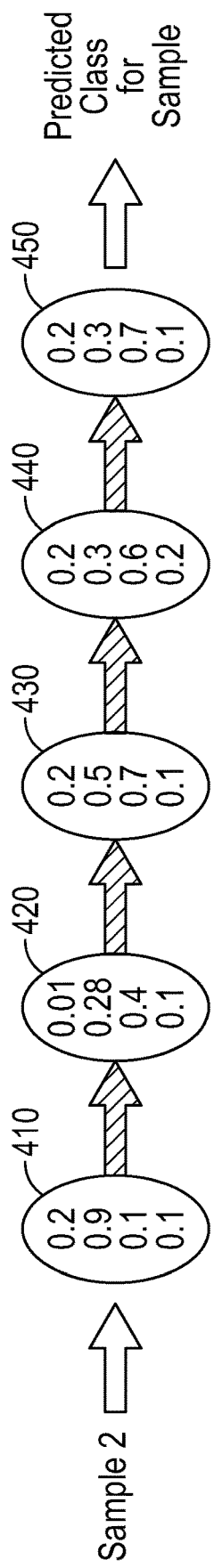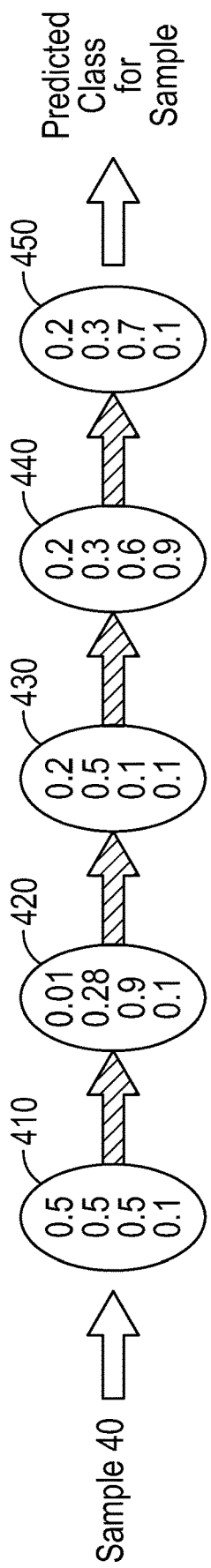

METHODS, SYSTEMS, AND APPARATUSES FOR USER-UNDERSTANDABLE EXPLAINABLE LEARNING MODELS

CROSS-REFERENCE TO RELATED APPLICATIONS

This application claims priority to the U.S. Provisional Patent Application 63/071,135, filed Aug. 27 th, 2020, the contents of which are hereby incorporated by reference.

BACKGROUND

The technical field generally relates to an autonomous, semi-autonomous, and conventional vehicle user explainable learning output method, system, and apparatus, and more particularly relate to methods, systems, and apparatuses of an explainable learning system that extends a Convolutional Neural Network (CNN) with a learning architecture and to capture semantics learned by an original classifier in order to compute a user-understandable explanation of the predicted output.

The public has a degree of reluctance when engaging autonomous and semi-autonomous functionalities in driving. This is because of the newness of the technology and the opaque nature when autonomous and semi-autonomous vehicles perform various driving maneuvers. The public views these systems because of the opaque nature without any ability or with limited ability to independently judge, assess, or predict a current or future automated driving maneuver that is being performed. This is because current data-driven learning models used in autonomous and semi-autonomous vehicles are black boxes. These systems can perform and predict the classification of samples of data about driving conditions and the surrounding environment into classes very accurately, but without any clarity to the user about the automated process that is currently or will be performed. Hence, from the human user perspective, the models are black boxes that fail to properly explain why the systems attain the outputs and actions based on their computations. There is lacking the necessary tools and systems that provide adequate feedback to drivers about driving maneuvers to raise inherent levels of discomfort felt by drivers when engaging the autonomous and semi-autonomous systems.

The use of connectionist learning models can be or is deemed successful at predicting a class of a sample of data with high accuracy. However, the black boxes that are used to implement the connectionist learning models suffer from low levels of interpretability.

Therefore, users can achieve benefit from further insight into understanding why a complex machine learning (ML) model produces a certain output.

It is desirable to implement explainable learning methods, systems, and apparatuses that provide an extension to Neural Network (NN) such as a Convolutional Neural Network (CNN) or the like with a learning architecture to process and to capture semantic content learned by an original classifier for further processing by an implemented CNN (or any other NN) and to generate user-understandable semantic explanations of predicted outputs.

It is desirable to have methods, systems, and apparatuses to implement an extended architecture, and by extension to process semantic content of a given classifier in an explainable classifier; to construct and train a set of connections of the explainable classifier for a new learning system that can validate output to a user, and can use appropriate criteria to quantify the outputs with an explainability of success or rationale using semantic expressions.

Furthermore, other desirable features and characteristics of the present disclosure will become apparent from the subsequent detailed description and the appended claims, taken in conjunction with the accompanying drawings and the foregoing technical field and background.

SUMMARY

Methods, systems, and apparatuses are provided to improve autonomous or semi-autonomous vehicles by an explainable learning system that extends a Convolution Neural Network (CNN) or other Neural Network (NN) with a learning architecture to capture semantics learned by an original classifier in order to compute a user-understandable explanation of the predicted output.

In an exemplary embodiment, a method for constructing an explainable user output is provided. The method includes receiving input data of a set of features for processing at a neural network composed of multiple classifier layers of an original classifier wherein the original classifier has been frozen with a set of weights related to features of the input data; determining a semantic function to categorize a data sample with a semantic category; determining a level of semantic accuracy for each layer of the original classifier within the neural network wherein the original classifier is a trained model; computing a representative vector with average activations of each layer's nodes for training samples of a semantic category for evaluation by computing distances of samples in a test set from available layers for each semantic category; computing a number of test samples for each layer and for each semantic category, that are closest to each other in each layer, to designate a layer with a highest score representative of a best semantics in each test samples; extending the designated layer by a category branch to the neural network to extract semantic data samples of the semantic content, and for extending by an extension the explainable classifier at the neural network based on a plurality of semantic categories; training a set of connections of the explainable classifier of the neural network to compute a set of output explanations with an accuracy measure associated each output explanation based on at least one semantic category of the plurality of semantic categories; and comparing the accuracy measure for each output explanation based on an extracted semantic data sample by the trained explainable classifier for each semantic category to generate an output explanation in an user understandable format.

In various exemplary embodiments, the method includes computing multiple explanations as outputs; and computing counterfactual explanations of composed explanations wherein the designated layer is an optimal semantic content layer. The method includes configuring the explainable classifier with a plurality of layers wherein each layer is configured with a set of weights; labeling an extracted input data sample of the explainable classifier with a set of defined semantic categories associated with the optimal semantic content layer; computing a centroid of activation for each layer of the plurality of layers of the explainable classifier; and computing based on the centroid of activation, the layer of the explainable classifier with maximal semantic accuracy. The method includes computing the maximal semantic accuracy based on the semantic function and optionally a redefined semantic function for each semantic category of the set of semantic categories.

The method includes designating at least one layer of the original classifier based on the amount of computed semantic accuracy by running an input data sample through each layer of the original classifier to observe a number of activations of nodes contained each layer; determining a set of distances between each node activation of a node layer for each sample and an average of node activations in corresponding node layer for all data samples in a training set for each semantic category; repeating the determining step for each consecutive input data sample until an average vector value for each layer's node is computed in each layer for each received input data sample and for each semantic category; retaining the average vector value for each node in each layer of the original classifier; scoring in each layer, an average of nodes in vectors wherein an average is configured as a vector; summing a set of scores of vector values for each layer that is received for all of data samples in a data set wherein the scored vector values in each layer are used to determine a layer with a maximum value; and designating the layer with the maximum value as the optimal semantic content layer.

The neural network includes a convoluted neural network (CNN), and the extension of the CNN. The method further includes an explainable classifier with an extension in the NN for driving comfort by extending the original classifier to extract semantic content via the designated layer to predict semantic categories corresponding to a feature set of vehicle dynamics and vehicle control. The method further includes training a set of connections in the extension of the NN of the explainable classifier for driving comfort while a set of weights of the original classifier is frozen; and adding an explanation maker to an output of the extension of the CNN to associate with data samples of the extracted semantic content. The method further includes an explainable classifier for trajectory predictions by extending the original classifier to extract semantic content via the designated layer to predict semantic categories associated with a semantic feature set, including sample data of convolution social pooling. The method further includes training a set of connections of the explainable classifier for trajectory planning and adding an explanation maker to output to associate with data samples of the semantic feature set, including sample data of convolution social pooling.

In another exemplary embodiment, a system for constructing an explainable user output is provided. The system includes a processor configured to receive input data to process a set of features at a neural network composed of multiple classifier layers of an original classifier wherein the original classifier has been frozen with a set of weights related to features of the input data; the processor configured to determine a semantic function to categorize a data sample with a semantic category, and to determine a level of semantic accuracy for each layer of the original classifier within the neural network wherein the original classifier is a trained model; the processor configured to compute a representative vector with average activations of each layer's nodes for training samples of a semantic category to evaluate by computation of distances of samples in a test set from available layers for each semantic category; the processor configured to compute a number of test samples for each layer and for each semantic category, that are closest to each other in each layer, to designate a layer with a highest score representative of a best semantics in each test samples wherein the designated layer is an optimal semantic content layer; the processor configured to extend the optimal semantic content layer by a category branch to the neural network to extract semantic data samples from the semantic content of the original classifier to the neural network, and to extend the NN with an explainable classifier to define a plurality of semantic categories; the processor configured to train a set of new connections of the explainable classifier of the neural network to compute a set of output explanations that are composed of explanations with an accuracy measure associated each output explanation based on at least one semantic category of the plurality of semantic categories; and the processor configured to compare the accuracy measure for each output explanation based on an extracted semantic data sample by the trained explainable classifier for each semantic category, and to generate the output explanation in an user understandable format.

In the various exemplary embodiments, the system includes the processor configured to compute multiple explanations as outputs and counterfactual explanations of composed explanations. The system further includes the processor configured to: apply the explainable classifier with a plurality of layers wherein each layer is configured with a set of weights; label the extracted input data sample by the explainable classifier with a set of defined semantic categories associated with the optimal semantic content layer; compute a centroid of activation for each layer of the plurality of layers of the explainable classifier; and compute based on the centroid of activation, the layer of the explainable classifier with a maximal semantic accuracy.

The system further includes the processor configured to: compute the maximal semantic accuracy based on a semantic function and optionally by a redefined semantic function for each semantic category of the defined set of semantic categories wherein the redefined semantic function provides more abstract semantic categories. The system further includes the processor configured to: designate at least one layer of the original classifier based on the amount of computed semantic accuracy by processing an input data sample through each layer of original classifier to determine a number of activations of nodes contained each layer; in response to determination of the number of node activations, determining a set of distances between each node activation of a node layer for each sample and an average of node activations in corresponding node layer for all data samples in the training set for each semantic category; repeat the determining for each consecutive input data sample until an average vector value for each layer's node is computed in each layer for each received input data sample; retain the average vector value for each node in each layer of the original classifier; score, in each layer, an average of nodes in vectors wherein the average is configured as a vector; sum, a set of scores of vector values for each layer that is received for all of data samples in a data set wherein the scored vector values in each layer are used to determine a layer with a maximum value; and designate the layer with the maximum value as the optimal semantic content layer. The system further includes the processor configured to extend the NN with an explainable classifier by extension of a convoluted neural network (CNN) for driving comfort by extension of the original classifier to extract semantic content via the designated layer to predict semantic categories corresponding to a feature set of vehicle dynamics and vehicle control; train only the set of weights of the new connections from the original CNN to the extended architecture wherein the set of weights of the original CNN trained for driving comfort are kept frozen and add an explanation maker to an output of the CNN to associate with the data samples associated with the extracted semantic content. The system further includes the processor configured to extend the NN with an explainable classifier for trajectory predictions by extension of the original classifier to extract semantic content via the designated layer to predict semantic categories associated with a feature set including sample data of convolution social pooling; train only the weights of the new connections from the original CNN to the extended architecture wherein the set of weights of the original CNN trained for predicting driving trajectories are kept frozen, and add an explanation maker to an output of the CNN to associate with the data samples associated with the feature set including sample data of convolution social pooling.

In yet another exemplary embodiment, an apparatus to execute an explainable classifier is provided. The apparatus includes at least one processor deployed in a vehicle, the at least one processor programmed to: receive input data of a set of features for processing at a neural network including a convoluted neural network (CNN) which is composed of multiple classifier layers of an original classifier wherein the original classifier has been frozen with a set of weights related to features of the input data; determine a semantic function to categorize a data sample with a semantic category; determine a level of semantic accuracy for each layer of the original classifier within the neural network wherein the original classifier is a trained model; compute a representative vector with average activations of each layer's nodes for training samples of a semantic category for evaluation by computing distances of samples in a test set from available layers for each semantic category; compute a number of test samples for each layer and for each semantic category, that are closest to each other in each layer, to designate a layer with a highest score representative of a best semantics in each test samples; redefine the semantic function to change the semantic accuracy to generate more semantic content in determining the semantic accuracy of each layer of the original classifier by the trained model wherein the redefinition of the semantic function is an optional step to provide more abstract semantic categories; extend the designated layer by a category branch to the neural network to extract semantic data samples derived from the semantic content, and to build an explainable classifier of the neural network to define a plurality of semantic categories; train a set of connections of the explainable classifier of the neural network to compute a set of output explanations with an accuracy measure associated each output explanation based on at least one semantic category of the plurality of semantic categories wherein the output explanations are well defined syntactic sentences; and compare the accuracy measure for each output explanation based on an extracted semantic data sample by the trained explainable classifier for each semantic category to generate the output explanation in an user understandable format.

In various exemplary embodiments, the apparatus includes the at least one processor programmed to configure the explainable classifier with a plurality of layers wherein each layer is configured with a set of weights; label the extracted input data sample of the explainable classifier with a set of defined semantic categories; associate the set of defined semantic categories with an optimal semantic content layer; compute a centroid of activation for each layer of the plurality of layers of the explainable classifier; and compute based on the centroid of activation, the layer of the explainable classifier with maximal semantic accuracy.

The apparatus further includes the at least one processor programmed to: compute the maximal semantic accuracy based on the redefined semantic function with inclusion of a redefined semantic category for the set of semantic categories; and create an output explanation in the user understandable format with use of the redefined semantic category.

BRIEF DESCRIPTION OF THE DRAWINGS

The exemplary embodiments will hereinafter be described in conjunction with the following drawing figures, wherein like numerals denote like elements, and wherein:

FIGS. 4A, 4B, 4C, 4D, 4E, 4F and 4G are exemplary flow diagrams illustrating the computation of the designated layer in the original classifier that contains most of the semantic data relative to a language of the semantic categories, configuring of a data set of samples with an optimization calculation, and computing the semantic accuracy of each layer of the explainable learning system in accordance with an embodiment;

DETAILED DESCRIPTION

Figure 1:
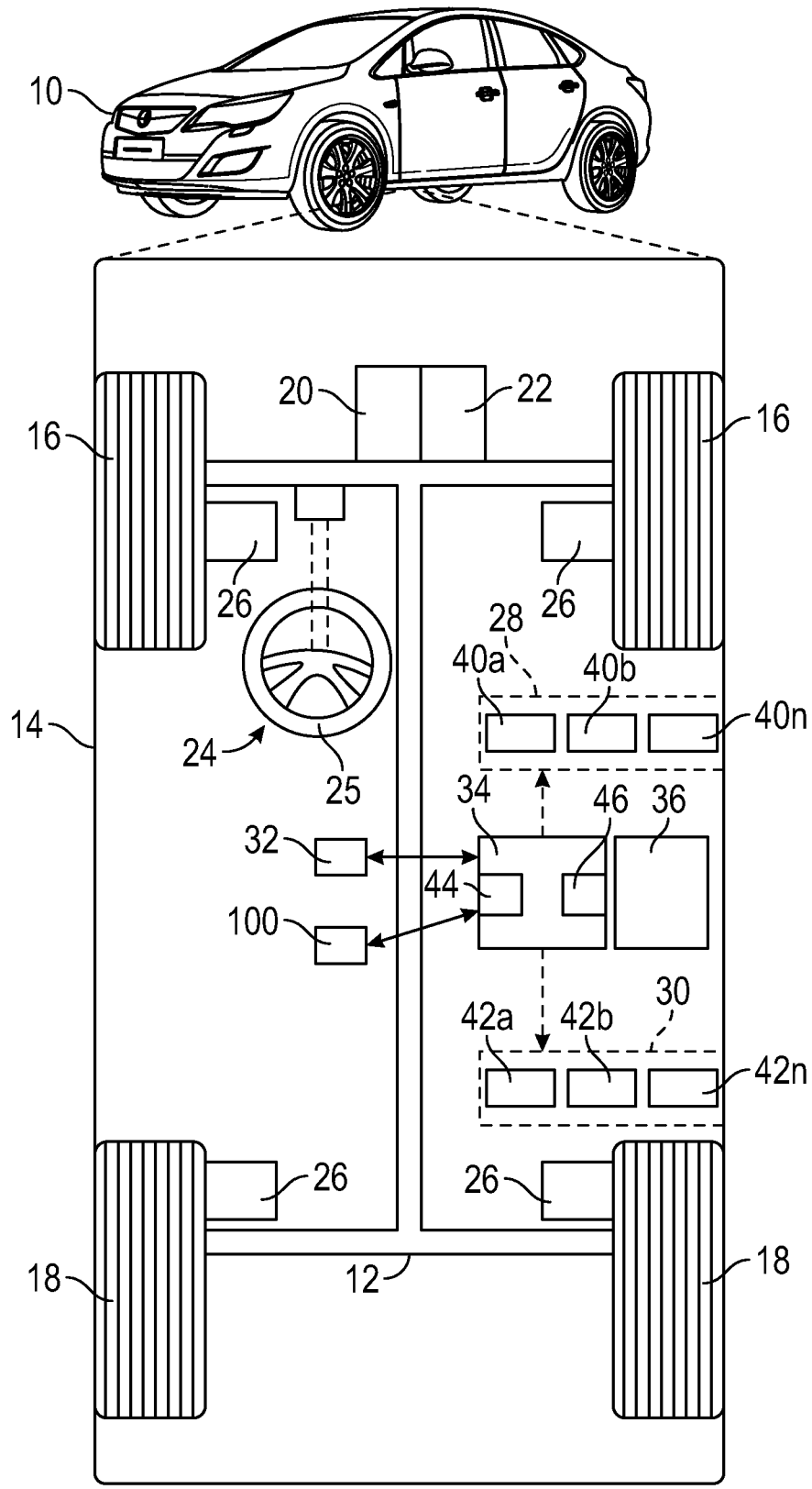
FIG. 1 illustrates a block diagram depicting an example vehicle that may include a processor of the explainable learning system in accordance with an exemplary embodiment.

The following detailed description is merely exemplary in nature and is not intended to limit the application and uses. Furthermore, there is no intention to be bound by any expressed or implied theory presented in the preceding technical field, background, summary, or the following detailed description.

As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

The performance of an automated planning system can be measured by a function of the value of its resulting actions and the cost incurred in achieving them. The present disclosure describes methods, systems, and apparatuses directed to the intersection of learning models and model-based planning work that enable explanation for the inner works of black boxes, which can provide contextual information, and useful in guiding model-based planners when deciding what actual action to take. There is a focus on computing semantics of such planning contexts. By adding semantics to the planning knowledge, the value of decision making by the user and the trust of the user can be improved. The present disclosure describes the methodology to assist the user in understanding advanced features that are computed by AI systems that perform functions based on the reason for complex decision-making procedures. The present disclosure describes, among other things, an explanation maker component that is responsible for producing human-understandable explanations with the inclusion of formatting of the predictions and the associated semantic explanation in a well-defined grammatically syntactic sentence.

In exemplary embodiments, the present disclosure describes the algorithmic approach to learning semantics in two classifiers, trained in two different domains relevant to automated driving to explain predictive classifications of driving comfort and driving trajectories.

Autonomous and semi-autonomous vehicles are capable of sensing their environment and navigating based on the sensed environment. Such vehicles sense their environment using multiple types of sensing devices such as radar, lidar, image sensors, camera devices, and the like.

The trajectory planning or generation for an autonomous vehicle can be considered the real-time planning of the vehicle's transition from one feasible state to the next, satisfying the vehicle's limits based on vehicle dynamics and constrained by the navigation lane boundaries and traffic rules, while avoiding, at the same time, obstacles including other road users as well as ground roughness and ditches.

The use of classifiers like Convolutional Neural Network (CNN) and Recursive Neural Network (RNN) and the like are deemed complex data-driven learning models that are often implemented from the user perspective as black boxes. In other words, there is absent any clear interpretation of the actual workings of the inner algorithms that perform the complex functions. It becomes even more prevalent in the realm of autonomous or semi-autonomous driving, when it is not clear to the developer or customer, what is the basis for the certain prediction that is about to occur, is occurring or if, in fact, it is indeed the correct one for a particular instance.

The performance measure to quantify the success of a classifier learning system is the accuracy of its predictions. The accuracy measure quantifies how well the classifier predicts relative to the training set it has learned. This measure is not often enough to enable a user to understand why a certain output was predicted by the classifier. Such understanding by the user is important when learning systems are implemented in actual products and are in actual execution. The users often need or want to understand the underlying rationale that a certain learning system used in making a decision, and the presentation of this rationale can enhance the user experience in the case of customers and provide insight into the automated behavior of an automotive system for technical personnel.

In various exemplary embodiments, the present disclosure describes architecture and methods to explain each one of the classifier's predictions in an understandable user format In various exemplary embodiments, the present disclosure describes a methodology that has been successful in extending given classifiers, training and evaluating them to produce explanations of their original predictions. The present disclosure describes the benefits of such semantic explanations in two domains: comfort driving and driving trajectories. In the first one, the present disclosure explains why the classifier predicted that a human will feel comfortable or not given a certain driving style. The semantic reasons provided, for example, by the explainable classifier may include traffic jams, pedestrians, bikers, and jaywalkers. In the second domain, the explainable classifier can explain why a vehicle was predicted to make lane changes or keep their current lane or brake. The explanations can include, as an example, other vehicles cutting in, traffic to be faster or not in the adjacent lanes, and traffic building up on the same lane producing slowdowns. In this domain, it can also be showed that the various explanations also include contrastive reasons. This is because it is not always the case that one semantic reason can be applied to a certain instance while another explanation should not be applied or is not applicable. For example, a vehicular slowdown could be predicated due to traffic building up and not because of vehicle cutting in the lane in front.

In various exemplary embodiments, the present disclosure describes methods, systems and apparatuses to compute a set of semantic categories for a given domain, including the desired level of abstraction of the categories; compute the best layer in the original classifier meaning, the layer of the original classifier that holds most of the semantic correspondence to the total set of inputs; train the explainable classifier network keeping the original learning model weights untouched; test the explainable classifier networks and quantify its explanation accuracy, and determine and compute the understandable user format of the explanations for each prediction of the original classifier.

In various exemplary embodiments, the present disclosure describes systems, methods, and apparatuses that compute the semantic categories language; compute the layer in the original classifier, holding most of the semantics relative to a language of semantic categories and a data set of samples; compute the semantic accuracy of each layer; refine the semantic language to a higher level language by abstraction, synonyms, etc.; extend learning architecture; train the new edges in the extension that includes the explainable classifier; compute the explanation accuracy of explanation outputs for each determined semantic categories; and format an understandable user explanation FIG. 1 illustrates a block diagram depicting an example vehicle 10 that may include a processor 44 that implements an explainable learning system 100. In general, input feature data is received by the explainable learning system (or simply "system") 100. The system 100 determines the explainable outputs based in part on the feature data received.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used. While the present disclosure is depicted in the vehicle 10, it is contemplated that the methodology presented is not limited to transportation systems or the transportation industry, but is and has applicability to any services, devices or applications where CNN type learning models are implemented. In other words, it is believed that the presented described methods, systems, and apparatus directed to explainable learning systems have broad applicability in a variety of diverse fields and applications.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, include an electric machine such as a permanent magnet (PM) motor or the like, as well as other electric and non-electric are also equally applicable. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various exemplary embodiments, include friction brakes, brake by wire, a regenerative braking system such as an electric machine, and/or other appropriate braking systems.

The steering system 24 influences the position of the vehicle wheels 16 and/or 18. While depicted as including a steering wheel 25 for illustrative purposes, in some exemplary embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various exemplary embodiments, vehicle 10 may also include interior and/or exterior vehicle features not illustrated in FIG. 1, such as various doors, a trunk, and cabin features such as air, music, lighting, touchscreen display components, and the like.

The data storage device 32 stores data that can be used in controlling the vehicle 10. In various exemplary embodiments, the data storage device 32 or similar systems can be located on board (in the vehicle 10) or can be located remotely on the cloud, or server or a personal device (i.e. smartphone, tablet, etc.,) The data storage device 32 may be part of the controller 34, separate from the controller 34, or part of the controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application-specific integrated circuit (ASIC) (e.g., a custom ASIC implementing a neural network), a field-programmable gate array (FPGA), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As an example, system 100 may include any number of additional sub-modules embedded within the controller 34, which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
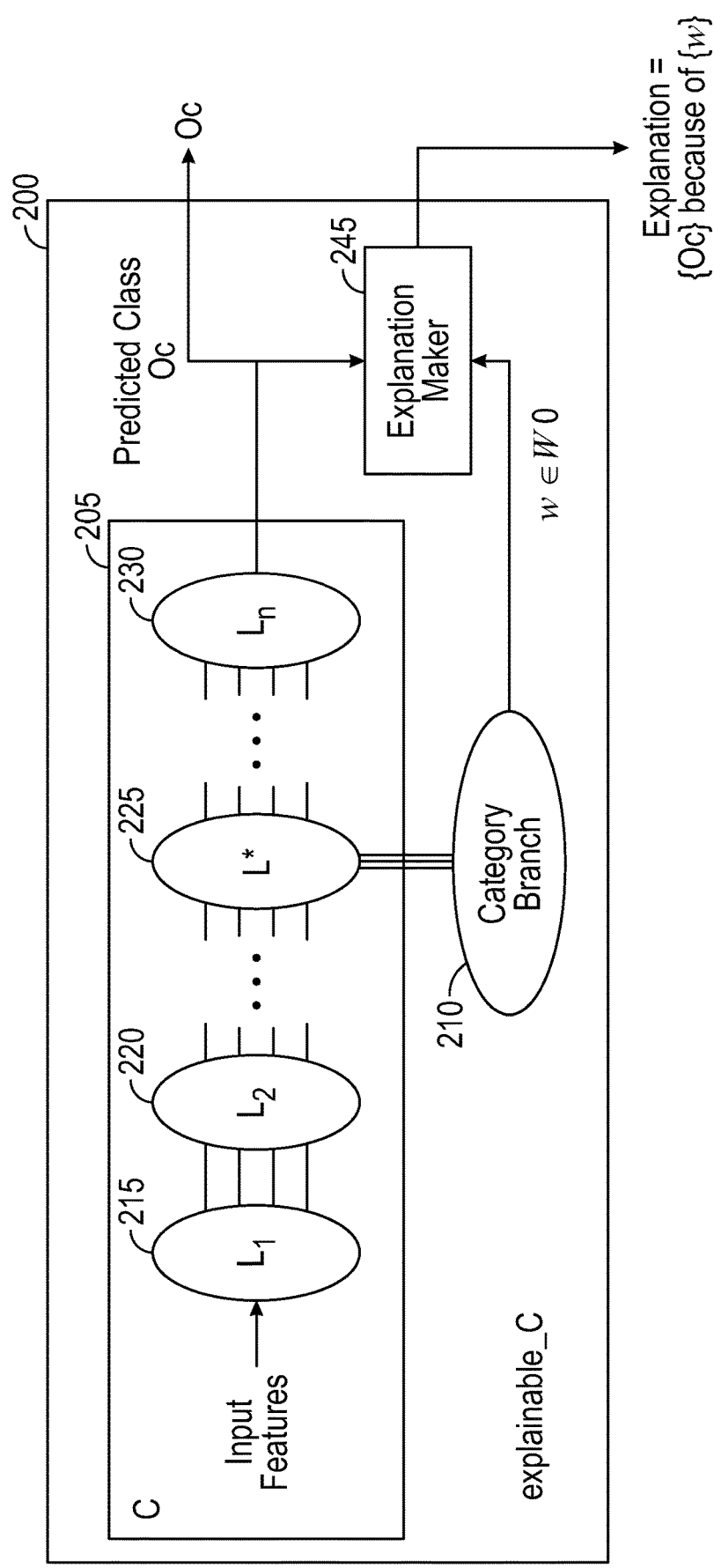
FIG. 2 is a functional diagram that illustrates an exemplary solution of use of a category branch or node of the explainable learning system in accordance with an embodiment.

FIG. 2 is a functional diagram that illustrates an exemplary solution 200 of the use of a category branch or node of the explainable learning system in accordance with an embodiment. In FIG. 2, the functional diagram includes a set of multiple layers $L_1$ (215), $L_2$ (220), . . . $L_n$(230) of an exemplary original classifier 205 that receives input features. The inputs features to each of the layers are weighted in accordance with the original classifier 205 provisioned configuration. The exemplary (or designated) layer L*(225) is selected from the set of multiples layers based on a computed solution using a semantic function by the learning model to determine the layer that contains the most available semantic information from each of the available layers $L_1$ (215), $L_2$ (220), . . . $L_n$ (230) in the set of layers of the original classifier 205. Because the determined or designated layer L*(225) contains the most semantic information, it is ascertained as the layer that is the "best" candidate to serve as an anchor for connecting to the extended explainable classifier (i.e., the category branch 210). The W0 is an initial (i.e., first) semantic language that is computed, and "W" is a word or category in the language that is learned to explain a predicted output Oc. Hence, based on the data of the input features to the original classifier 205, a set of semantic categories is computed. The category branch 210 extends the original classifier 205 to extract semantic categories from received semantic data samples that are relevant to learned predictions and is used as the basis to output an explanation which is formatted in a manner that is understandable to the user via the explanation maker 245. The explainable classifier learns why a certain prediction is outputted for a certain input feature from a data set. The explanations are taken from the semantic categories. More concisely, for a given classifier (C), an explanation is constructed as to why this classifier outputs a certain output (Oc) for a certain input (Ic). By the extension of the category branch 210, and further processing by another neutral network, the extended CNN classifier (of the category branch 210) makes or constructs an explainable classifier (explainable C): For each output Oc, the explainable C will output Oc with an explanation.

Figure 3A:
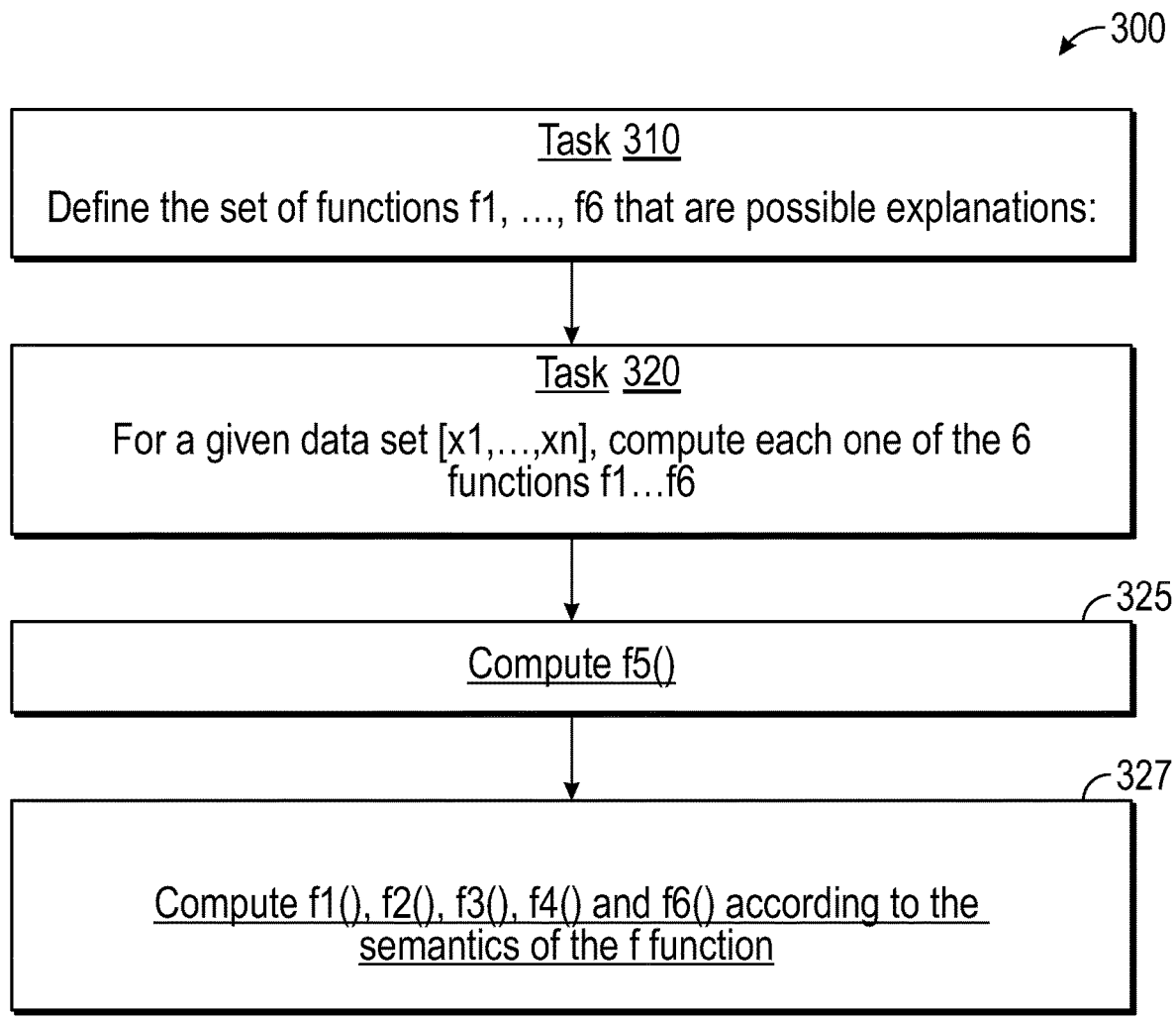
FIGS. 3A and 3B are exemplary flowcharts of the explainable learning system in accordance with an embodiment.
Figure 3B:
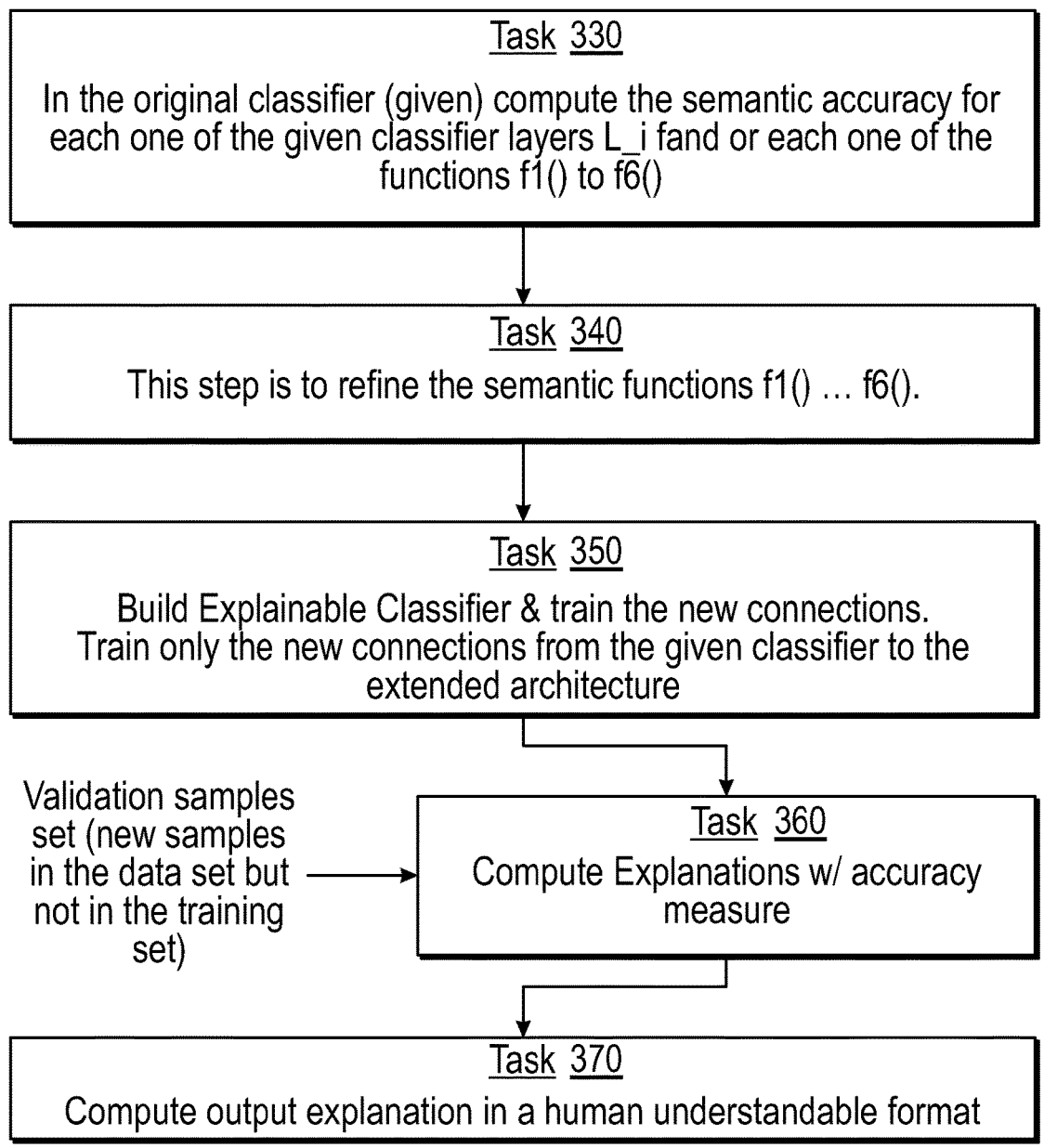

FIGS. 3A and 3B are exemplary flowcharts illustrating a method 300 that may be performed by the explainable learning system 200 of FIG. 2 in accordance with an embodiment. In various exemplary embodiments, the exemplary method 300 includes various tasks or steps that enable a certain original classifier 205 (FIG. 2) to receive inputs of a form=[x1, x2, ..., xn] in order to output a class associated with each input. That is, the explanations for the classes are predicted, and are dependent on the semantic functions f1, f2, ..., fk that computes for the parameters x1, ..., xn in the data set, f1(x1, x2, ..., xn), f2(x1, x2 ..., xn), ..., f1(x1, x2, ..., xn). The semantic functions f1( )fk( ) are the explanations that are relevant to the predictions made for a given classifier or original classifier. The computing is performed of the functions over the parameters x1, ..., xn in the data set for each sample of semantic data in the data set.

By extending the architecture of the given classifier network, the training of the extended connections of the new classifier network (i.e., another neural network) is enabled and the new classifier network to learn what function f( ) corresponds to the data input x1 ... xn and the class prediction output of the original classifier for input x1 ... xn (this training can lead to more than one function as a possible explanation and also includes why-not a certain function does not explain the prediction). In evaluating the extended connections of the new classifier, the neural network requires evaluating the output that is produced in the output explanations in a human-understandable format.

In tasks 310, 320, and 330 of the exemplary method 300, the explainable learning system 200 defines the semantic language. The semantic categories language from data in the inputs set of the existing classifier is computed. This data is not used in the original training of the classifier. For example, at task 310, a set of functions to why an ego vehicle brake, changes lane, or continue its course without change: is defined for the functions of the set (f1, f6) that are possible explanations: f1=Open-road, f2=Cut-in-left, f3=Cut-in-right, f4=Slowdown, f5=Left-lane-faster, f6=Right-lane-faster.

At task 320, for a given data set [x1, ..., xn], the explainable learning system 200 computes each one of the 6 functions f1 ... f6. For example, f5(ego-lane, ego-speed, ego-preceding-lane, ego-preceding-speed, otherV1-speed, otherV1-lane, ..., other Vk-speed, other Vk-lane).

In an exemplary case, where the lanes IDs are coded such that consecutive lanes have an absolute difference in the ID of 1, and that a lane to the left always has a smaller ID. An exemplary computation code that can be used in the semantic function is as follows:

At 325, Compute f5( )
For all vehicles other Vi:
If otherVi-lane=Ego-lane −1 then Add otherVi (speed, lane) to otherVehiclesList
For all vehicles in otherVehiclesList
sumSpeed+=otherVi in otherVehiclesList
AverageLeftLaneSpeed=sumSpeed/sizeOf (otherVehiclesList)
If (AverageLeftLaneSpeed>ego-preceding-speed) then return Left-Lane-Faster=1
Else return Left-Lane-Faster=0
Hence, at 327, the Compute f1( ) f2( ) f3( ) f4( ) and f6( ) according to the semantics of the f function.

In various exemplary embodiments, the elements of the language would be considered as possible explanations that are used in computing to explain the classifier's outputs. In such language, the explainable learning system 200 defines W0 to include the elements in the context that can be recognized by a user to affect or change the classification outputs. For example, in a driving context, W0 might be defined to include "accident," "traffic jam," "jaywalker," "hazard," etc. These are semantic constructs that a user might use to describe a driving scenario when trying to explain a certain driving behavior.

In various exemplary embodiments in tasks 310 to 330, for constructing the semantically labeling, the explainable learning system 200 labels all or approximately all the samples in the given classifier data set with an additional category taken from the semantic language W0. In various embodiments, the labeling can be done either by manual annotation or by computation.

At task 330, the explainable learning system 200 refines the semantic functions f1( ) to f60. For example, in some domains, the explainable learning system 200 recognizes after computing the semantic accuracy that new functions g( ) can be computed out of the f functions. For example, if f1( )=a pedestrian is crossing, f2( )=an animal is crossing, then the explainable learning system can define a new function g1 (f1, f2)=a VRU (vulnerable road user) is crossing=f1( ) or f2( )

At task 340, the explainable learning system 200 computes or designates the (semantically) best layer. In order to extend the given classifier or original classifier to output an explanation for each of its predicted outputs, it is necessary to compute the layer in the original classifier from which will be designated for extension of the learning architecture. The designated layer is denoted as layer L*. The objective of the explainable learning system 200 is to determine the layer that contains the most semantic information or data. The original classifier does not consider when performing its classification, which of its layers contains the most semantic information. To compute the designated layer L*, it is necessary to first compute a centroid of each layer L in the original classifier. It should also be noted that the original classifier can be a CNN classifier. The centroid is computed by the original classifier for each category w in W0 (the semantic language that has been defined) and for each layer L in the classifier on a given training set. Each centroid is referred to with the function $\vec{A_{L,w}}$ as follows, where activation of a layer L for a sample x is the vector including all nodes' activations in that layer when x is the sample being evaluated:

$$\overrightarrow{A_{L,w}} = \frac{1}{|\{x \mid x \in w\}|} \sum_{x \in w} \text{activation}_L(x).$$

Next, at 340, the explainable learning system 200 computes the semantic accuracy for each layer L in the original classifier, given a test feature data set labeled already with their semantic categories. The semantic accuracy measure (computed for any layer L and semantic category Wi) is an average of the semantic prediction success for $f_L(W_i)$ of all samples in a test set. This means that the distance for the activation of a sample is closest to the computed centroid in a given layer L. Since the test feature data samples are also labeled with a semantic label, the explainable learning system 200 can also compute how many samples were closest to their (semantic) corresponding centroid. The explainable learning system 200 computes only the closest value as the one with the minimal distance. In various exemplary alternative embodiments, the explainable learning system 200 can be configured to implement different distance measures, and thresholds affect in determining the quality of the semantic accuracy or measure. The measured semantic accuracy is as follows:

$$\text{semantic accuracy}(L) = \sum_{i=1}^{N} f_L(W_i)/N$$

$$f_L(W_i) = \begin{cases} 1, & \text{activation}_L \text{ (test sample } i) \text{ is closest to } \overrightarrow{A_{L,w_i}} \\ 0, & \text{otherwise} \end{cases}$$

Then, the explainable learning system 200 finds the designated layer L* for the semantic language W0, by taking or selecting the layer L with a maximal value of semantic accuracy.

At task 340, the semantic functions f1( ) to f6( ) are refined. For example, in some domains, new functions g can be computed out of the f functions. For example, if f1 ( ) a pedestrian is crossing, f20=an animal is crossing, then a new function is defined g1 (f1, f2)=a VRU is crossing=f1( ) or f20.

In various exemplary embodiments, and in task 330, the explainable learning system 200 is configured to refine the semantic language W0. It is possible to define a new language W1 as a refinement of the semantic language defined in task 1. For example, for certain complex domains, it may be desired to output a simpler explanation to a user that may include the use of abstractions, synonyms, or packets of related words.

At task 350, the explainable learning system 200 builds the explainable classifier and trains a new set of connections within the explainable classifier to create the new neural network.

In various embodiments, the explainable learning system 200 is configured to only train the new connections or inputs received from the original classifier that has been formed in the extended architecture by the extension of the category branch. The explainable learning system 200 in task 350, extends, creates, or builds an extension that includes the explainable classifier by creating step architectural changes when linking the original classifier.

In an exemplary embodiment, at 350, the explainable learning system 200 trains the new explainable classifier in two new nodes by creating the first node of a "semantic branch" and the second node of an "explanation maker" (See FIG. 2). The semantic branch node is connected to a classifier layer L*(that has been computed in task 4). The explanation maker is connected to the semantic branch and outputs an actual explanation when a predicted class is output by the original classifier. The explainable learning system 200 trains the explainable classifier, while the weights which are already learned in the original classifier are frozen or remain static. In other words, the explainable learning system 200 is configured only to required additional training and learning for a new set of weights for the semantic branch in order to capture the semantic category that is closest to the predicted class.

At task 360, the explainable learning system 200 computes the explanation accuracy with an accuracy measure of explanation outputs for each determined semantic category. For example: for a given data sample x1 . . . xn, the explainable learning system 200 computes the explanation: ego vehicle is predicted to make a left lane change because the lane to its left is faster and not because another vehicle is cutting in. The validation in task 5, sample only new samples of the data set and not samples generated used in the training set.

The explainable learning system 200 implements in task 370 a simple explanation maker logic: a human-understandable syntax template is assumed where the predicted class and the explanation computed are output in the corresponding syntactic locations in the phrase: "Output is {Oc} because of {explanation output}." It demonstrates the successful learning of explanations in two automated driving experiments: driving comfort and driving trajectories.

FIGS. 4A, 4B, 4C, 4D, 4E, 4F and 4G are exemplary flow diagrams illustrating the computation of the designated layer in the original classifier that contains most of the semantic data relative to a language of the semantic categories, configuring of a data set of samples with an optimization calculation, and computing the semantic accuracy of each layer of the explainable learning system in accordance with an embodiment.

In various exemplary embodiments, for FIGS. 4A to 4F, in describing the process of the explainable learning system 200, implements a set of exemplary assumptions. For example, the explainable learning system 200 assumes that the user's vehicle is surrounded by 3 other vehicles that are identified as A, B, and C based on a data set that includes approximately 100 samples. In each of the 100 samples, the explainable learning system 200 makes the assumption that each sample is configured at a time t=[My-vehicle-location, My-vehicle-speed, A-location, A-speed, B-location, B-speed, C-location, C-speed]. Out of the 100 samples in this example, 40 samples include group 1 (used in the training step), another 40 samples include group 2 (used in the training step). The remaining 20 samples are divided into group 3 (7 samples) and group 4 (13 samples). Both groups 3 and 4 are used in the test step. Further, with respect to each sample, the following sample assumptions 1 to 4 are also made as follows: (1) the explainable learning system makes the assumption of 40 samples (Group 1) of the 100 samples can be labeled with "another vehicle is cutting me in"; (2) the explainable learning system makes the assumptions that the other 40 samples (group 2) of the 100 samples can be labeled with "my road is open"; (3) In the remaining 20 samples (group 3), the explainable learning system makes the assumption that 7 samples can be labeled w/"another vehicle is cutting me in"; and (4) In the remaining 20 samples (group 4), the explainable learning system makes the assumption that 13 samples can be labeled w/ with "my road is open." Next, in FIG. 4A, it makes the assumption that the given classifier for the extension is configured with only 5 layers, L1 (410), L2 (420), L3 (430), L4 (440), and L$_5$ (450), for processing each sample and generating a predicted class for each sample.

Figure 4A:
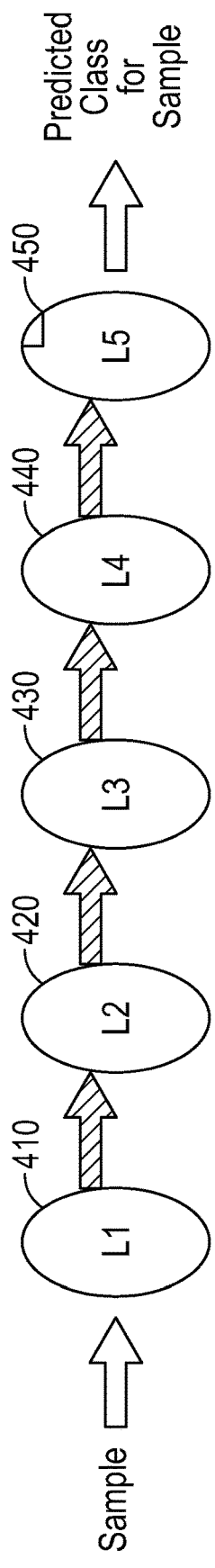
Figure 4B:
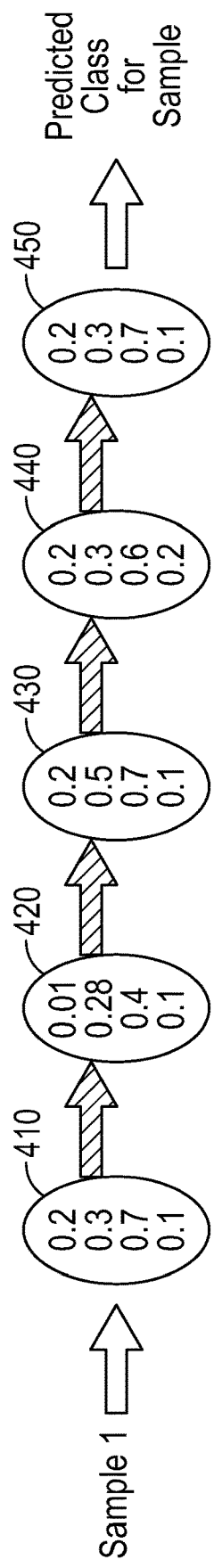
Figure 4C:
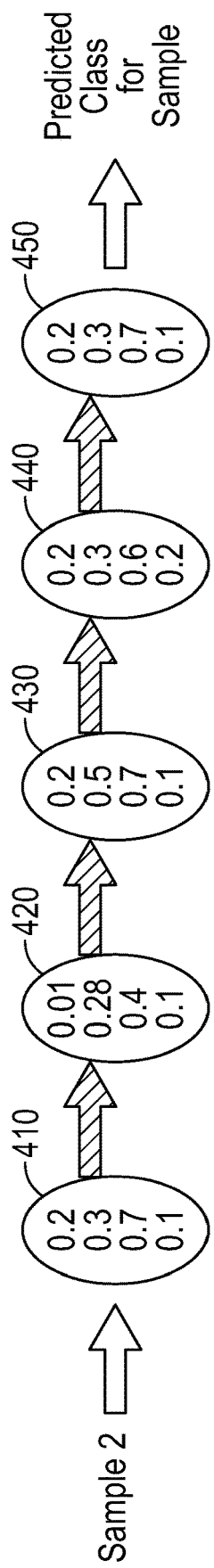
Figure 4D:

Next, in FIGS. 4B and 4C, the flow process of processing the 100 samples by the explainable learning system are illustrated by initially running (i.e., processing) the first 40 samples of group 1 through the neural network. Next, the explainable learning system monitors the activations in nodes contains in each of the layers of the neural network to determine a set of nodes that are fired in each of the executed runs for each sample. For example, in FIG. 4B, the "Sample 1" is sent and processed at L1, where at L1 there is illustrated a set of observed node activations denoted by the computations "0.2, 0.3, 0.7, and 0.1", and so forth as illustrated in the other consecutive layers L2-L5 subsequently generating a predicted class for Sample 1. Similarly, in FIG. 4C, "Sample 2" is processed in L1 and includes another set of node activations denoted by the computations "0.2, 0.3, 0.7, and 0.1" in L1, and so forth in the other consecutive layers L2-L5 subsequently generating a predicted class for Sample 2. Further, likewise, in FIG. 4D, "Sample 3" is processed in L1 and includes another set of node activations denoted by the computations "0.2, 0.3, 0.7, and 0.1" in L1, and so forth in the other consecutive layers L2-L5 subsequently generating a predicted class for Sample 3.

Next, in FIG. 4G, the explainable learning system generates and retains a set of averages of the numbers based on the computations in each layer, to create a trained classification model with the learned semantic category representative of "another vehicle cutting me in" (i.e., for the category associated with approximately all of the 40 samples of each group). That is, the 5 vector averages are represented as follows:

X1=[Avg of the first node in the first layer, Avg of the second node in the first layer, . . . , Average of 4$^{th}$ node in the first layer]

X2=[Avg of the first node in the second layer, Avg of the second node in the second layer, . . . , Average of 4$^{th}$ node in the second layer]

X3=[Avg of the first node in the third layer, Avg of the second node in the third layer, . . . , Average of 4$^{th}$ node in the third layer]

X4=[Avg of the first node in the fourth layer, Avg of the second node in the fourth layer, . . . , Average of 4$^{th}$ node in the fourth layer]

X5=[Avg of the first node in the fifth layer, Avg of the second node in the fifth layer, . . . , Average of 4$^{th}$ node in the fifth layer]

As illustrated in FIGS. 4E, and 4F, the processing steps of FIGS. 4A-4D are repeated for all 40 samples.

Then, as illustrated in FIG. 4G, the averages in each layer for "my road is open," which is the category of all the 40 (in group 2 samples are represented with a new set of vector averages Y1 to Y5 as follows:

Y1=[Avg of the first node in the first layer, Avg of the second node in the first layer, . . . , Average of 4$^{th}$ node in the first layer];

Y2=[Avg of the first node in the second layer, Avg of the second node in the second layer, . . . , Average of 4$^{th}$ node in the second layer];

Y3=[Avg of the first node in the third layer, Avg of the second node in the third layer, . . . , Average of 4$^{th}$ node in the third layer];

Y4=[Avg of the first node in the fourth layer, Avg of the second node in the fourth layer, . . . , Average of 4$^{th}$ node in the fourth layer]; and Y5=[Avg of the first node in the fifth layer, Avg of the second node in the fifth layer, . . . , Average of 4$^{th}$ node in the fifth layer]

The scoring is made only for groups 3 and 4 in the test set. The averages for each layer and for each semantic category were computed based on processing the training set composed of groups 1 and 2. The distances are computed on the test set composed of groups 3 and 4. A layer is scored only when a distance from a test sample to the average activations of this layer for a particular semantic category is the closest.

For example, for layer L1: If the sample is one of the 7 cases in the test set (group 3) in the remaining 20 samples that was given the category "another vehicle is cutting me in" and this sample causes activations of nodes in layer 1 that are closest to X1 (rather to Y1), the explainable learning system attributes a score of 1 to Layer L1; else Layer L1 is given a score of 0. If the sample is one of the 13 (in group 4) in the 20 samples in the test set that was given the category "open road," and this sample causes activations in layer L1 that is closest to Y1 (rather than to X1), the explainable learning system attributes a score of 1 to Layer L1; else Layer L1 is given a score of 0. The final score of Layer L1 will then be determined by the sum of the 1 scores based on all computations that have been performed for each of the 20 samples. The chosen layer L*is the layer (out of the set of layers L1, L2, L3, L4, and L5) that has received a maximum summed score.

Figure 5:
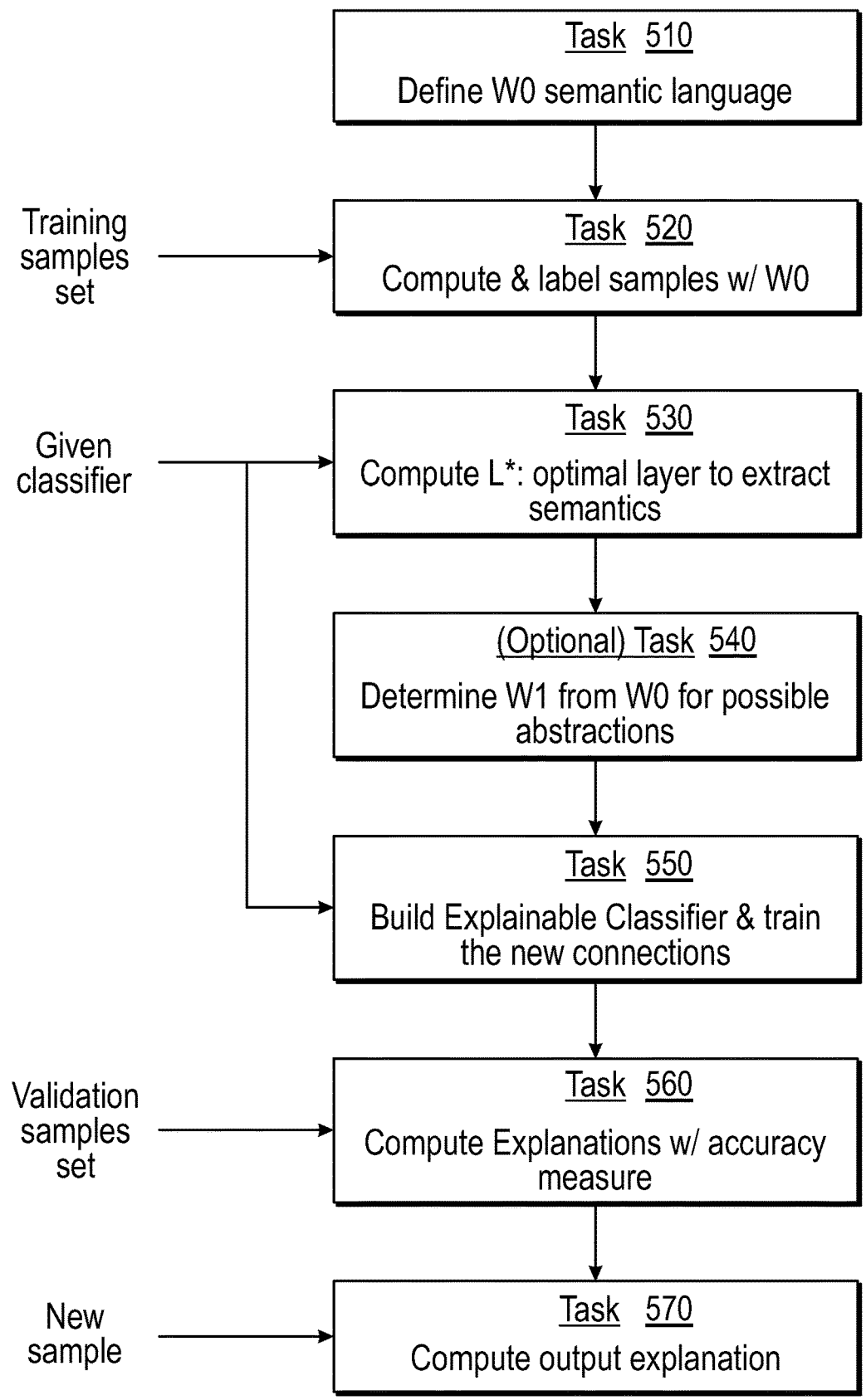
FIG. 5 is another flowchart of the explainable learning system in accordance with an embodiment.

FIG. 5 is another flowchart of the explainable learning system in accordance with an embodiment. The flowchart of FIG. 5, is a higher level flowchart than FIGS. 3A-3B. In FIG. 5, the explainable learning system 200 configures the training of the samples of the semantic classification model of the explainable learning system 200 in a single step of task 2. Briefly, in the flowchart 500 of FIG. 5, the explainable learning system performs the tasks of initially at Tasks 510 and 520 by defining the W0 sematic language by performing the steps of: (1) at task 510, defined by the explainable learning system a set of semantic categories W0 as the possible explanation outputs (e.g., the elements in the context that affect the classification output); and (2) at task 520, computing a label for each training sample with the categories in W0.

Next, at task 530, the explainable learning system 200 performs the computation of L*for only the computation of semantic categories for each sample in the training set, by the steps of (1) For each layer L in C, for each category w in W0: compute the centroid (average) of activations in layer L for a given training set by the function:

$$\overrightarrow{A_{L,w}} = \frac{1}{|\{x \mid x \in w\}|} \sum_{x \in w} \text{activation}_L(x);$$

and (2) For each layer L in C, compute the semantic accuracy, given a test-set labeled with semantic ground truth (W):

$$\text{semantic accuracy}(L) = \sum_{i=1}^{N} f_L(W_i)/N$$

$$f_L(W_i) = \begin{cases} 1, & \text{activation}_L \text{ (test sample } i \text{) is closest to } \overrightarrow{A_{L,w_i}} \\ 0, & \text{otherwise} \end{cases}$$

Find the layer in the classifier that performs best for W0: L*=argmax (semantic accuracy (L)).

At task 540, the explainable learning system 200 determines W1 from W0 for possible abstractions. For example, a possible extension may be implemented to define new categories W1 based on W0 in the selected layer L*(e.g., W1 can be derived using a packet or data set of words (i.e., ontology database) for terminology such as synonyms, and generalizations to enable technical terms to be replaced with more user understandable language). It should be noted that there is no relation between the refinement of W0 to become W1 and the best semantic layer L*.

At task 550, the explainable learning system 200 is configured to build an explainable classifier and train a model with new connections of the classifier by extending a new branch connected to layer L*(i.e., to the semantic branch) of the original classifier that will enable learned output semantic categories associated with the output predictions of the original classifier to corresponding categories in the W0 (i.e., set of a semantic language of categories). The trained explainable classifier will train using the set of freeze weights of the original classifier to which it is connected. The trained classifier will learn only the weights in the semantic branch based on the newly trained sample that has been labeled in task 520. The training step can be configured to learn the weights to the semantic branch so that the W0 is configured with an output of the new branch (e.g., using cross-entropy loss or another appropriate loss function). At task 560, the sample sets are validated for the outputted computed explanation based upon an accuracy measurement. For example, an "explanation maker" is added for labels of the new classifier neural network. The explainable learning system can make use of test samples to compute the explanation accuracy of each explanation outputs for the determined semantic categories. At task 570, an explanation="Output is {Oc} because of {output of semantic branch of explainable C}". The explainable learning system trains the explainable classifier while it freezes the weights that have already been learned in the given classifier C. Therefore, it only learns the new weights for the semantic branch to capture the semantic category that is closest to the predicted class. A simple explanation maker logic to assume a human-understandable syntax template where the predicted class and the explanation computed are output in the corresponding syntactic locations in the phrase: "Output is {Oc} because of {explanation output}."

Figure 6:
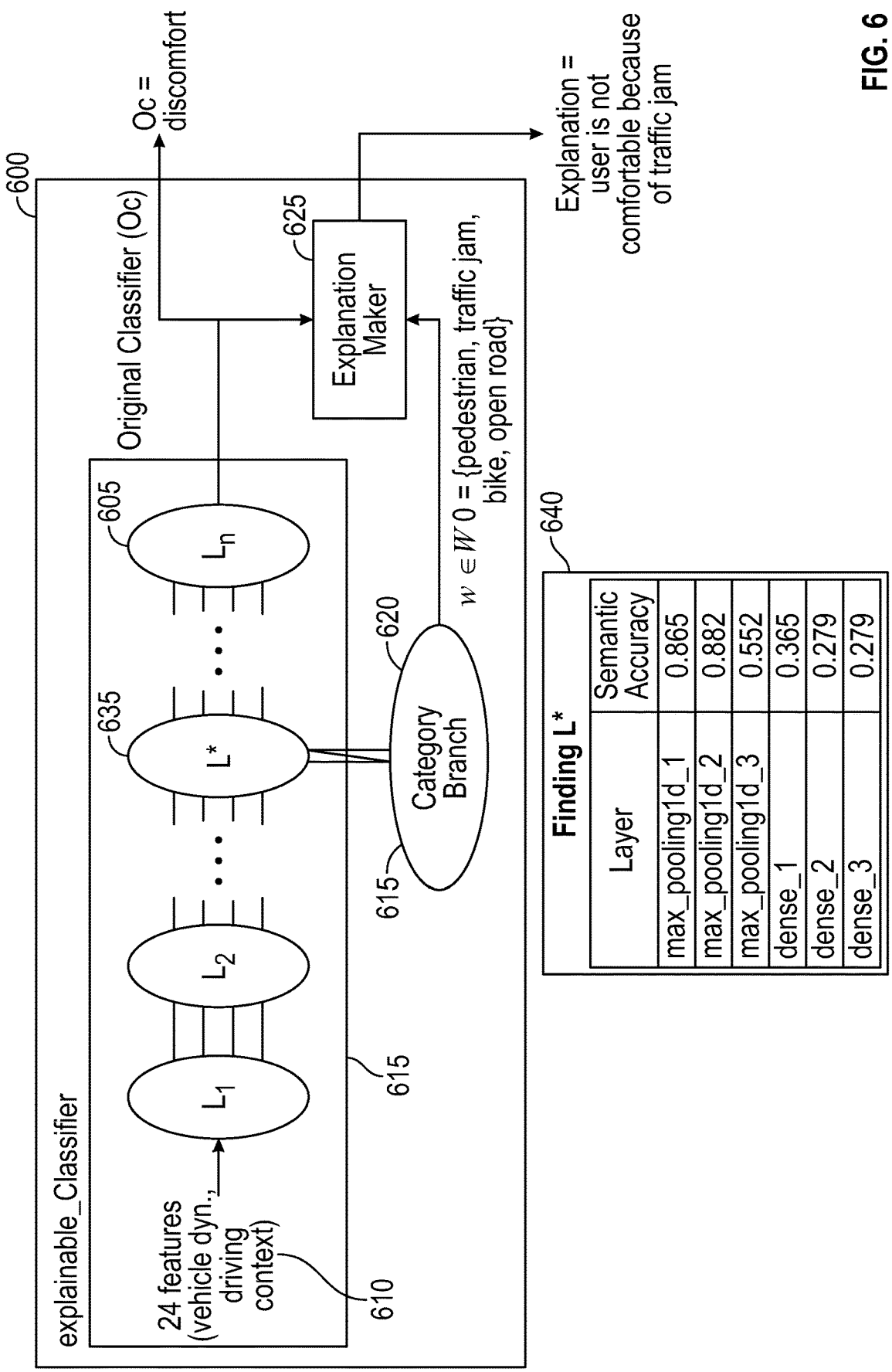
FIG. 6 is an exemplary diagram of explanatory driving comfort predictions of the explainable learning system in accordance with an embodiment.

FIG. 6 is an exemplary diagram of explanatory driving comfort predictions of the explainable learning system 200 in accordance with an embodiment. The CNN used by the explainable learning system 200 may be constructed in a manner to predict the comfort or discomfort of a participant during an automated (i.e., simulated) ride that is instigated. In an exemplary embodiment, the CNN may be trained and evaluated with studies from over 100 participants that resulted in the eventual attainment of approximately 117K data points (for the referred data and original classifier see Adaptive Driving Agent in Proceedings of the 8$^{th}$ international conference on human agent interaction Goldman et al 2020). By implementing the process flow of FIG. 5 (i.e., the 5 tasks laid out) in which an explainable CNN may be constructed and which can output human-understandable explanations for comfort predictions.

In FIG. 6, the explainable learning system 600 includes an input composed of 24 features 610 related to driving context and vehicle dynamics to the original classifier ($O_c$) 605 that is processed in the weight layers $L_1$ to $L_n$ as described earlier in FIGS. 2-5. The extension to the CNN C makes it an explainable (explainable C 615), and for each output of Oc 605, the explainable C 615 will output of the Oc 605 with an explanation The chosen or designated layer L*635 is connected to the category branch 620 that constructs the trained text model of w ∈ W0={pedestrian, traffic jam, bike, open road} sent to the explanation maker 625. The output of the original classifier 605 will indicate predicted driver discomfort. The explanation maker 625 will generate the explanation=user is not comfortable because of traffic jam. The designated L*layer findings 640 for each layer indicate the computed semantic accuracy.

In the exemplary table below of the sample results of the explainable learning system in accordance with an embodiment. In the exemplary table below, the example domain 1 of the explainable CNN for driving comfort prediction outputs from the explanation maker, the explainable output.

| Test sample # | Explainable output |
| --- | --- |
| 1 | user is uncomfortable because of traffic |
| 2 | user is uncomfortable because of traffic |
| 3 | user is uncomfortable because of traffic |
| 4 | user is uncomfortable because of bicycle |
| 5 | user is uncomfortable because of hazard |
| 6 | user is uncomfortable because of cut in |
| 7 | user is uncomfortable because of cut in |
| 8 | user is uncomfortable because of jaywalker |
| 9 | user is uncomfortable because of pedestrian |
| 10 | user is uncomfortable because of dense road |
| 11 | user is comfortable because of dense road |

The explainable output for test sample 1 is the phrase "user is uncomfortable because of traffic." The phrase includes the explanatory predicate of "because of traffic," that is the cause of the subject that the "user is uncomfortable." In other words, a two-part structure is constructed of a subject of the condition and the predicate which is the explanation of the condition. The built explainable classifier of FIG. 6 extends the original classifier with a semantic branch connected to layer L*, trains the explainable classifier, while the weights in original classifier are frozen, and adds an explanation maker on top of the network. The use samples explanation="Output is {Oc} because of {output of the semantic branch of explainable C}."

Figure 7:
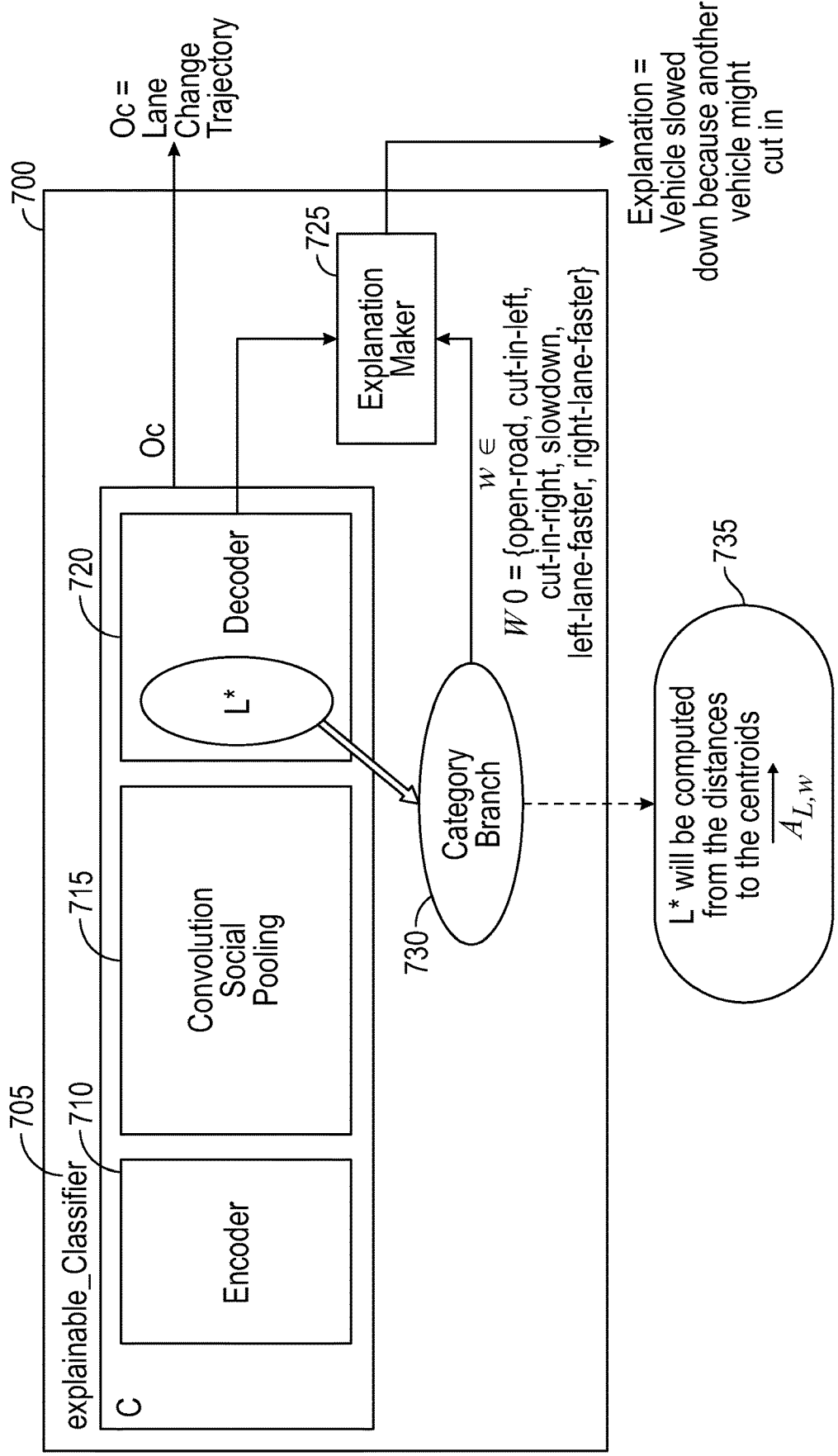
FIG. 7 is an exemplary diagram for explaining vehicle trajectory predictions of the explainable learning system in accordance with an embodiment.
Figure 8:
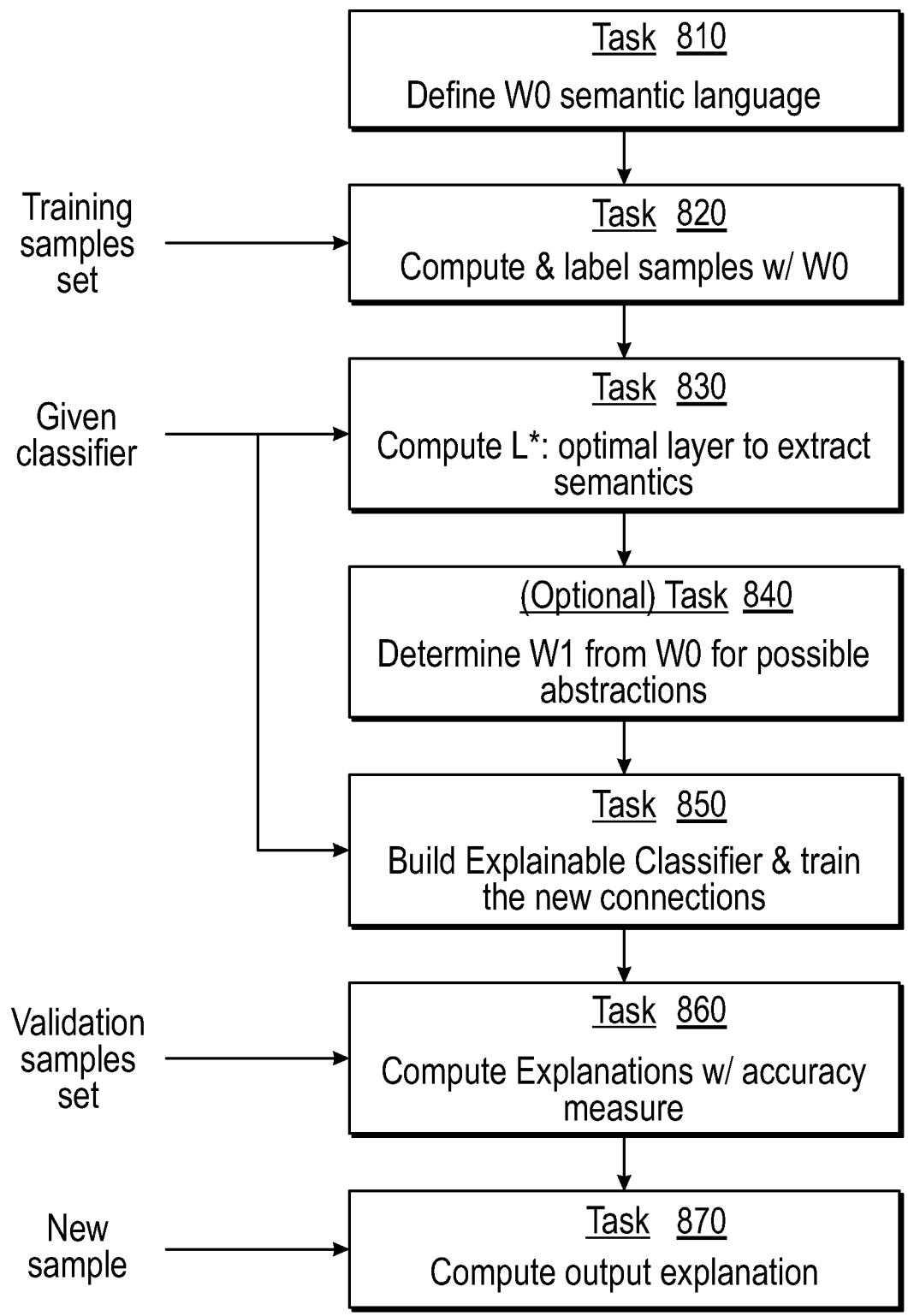
FIG. 8 is an exemplary flowchart of the explainable CNN for vehicle trajectory prediction of the explainable learning system in accordance with an embodiment.

FIG. 7 is an exemplary diagram for explaining vehicle trajectory predictions of the explainable learning system in accordance with an embodiment. In FIG. 7 the explainable learning system 700 includes an explainable classifier 705, including an encoder 710, a convolution solution pooling module 715, and a decoder 720 containing the chosen layer L*. (An exemplary original classifier of the type implemented by the convolution solution pooling module 715 is described in "Convolutional Social Pooling for Vehicle Trajectory Prediction" by Deo. N and Trivedi, M. M. Proceedings of CVPR workshop 2018). The Layer L*may be computed (at 735) from the distances to the centroids $\vec{A}_{L,w}$. The Explanation=Vehicle slowed down because another vehicle might cut in. For the category branch, in this second domain, the explainable learning system does not compute explicitly L*because the original architecture of the classifier indicates that the designated layer is the only reasonable choice. Prior to designating the Layer L*, the neural network of the explainable classifier 705 does not include information about the ego vehicle after the layer is designated, the neural network continues as a long short term memory (LSTM) neural network (and it is not configured as a CNN). In this case, expert knowledge was sufficient to choose the designated layer L*without requiring computation to determine it. Also in FIG. 7, the correspondence between Oc and the output explanation is as follows: the Oc is a prediction to whether the vehicle is going to make a lane change and/or brake FIG. 8 is an exemplary flowchart of the explainable CNN for vehicle trajectory prediction of the explainable learning system in accordance with an embodiment. In FIG. 8, at task 810, the explainable learning system defines the W0 semantic language as W0={Open-road, Cut-in-left, Cut-in-right, Slowdown, Left-lane-faster, Right-lane-faster}. At Task 820, the training samples are received, and are computed with the label samples with the W0. In an exemplary embodiment, the computations can include functions like the neighbor lane is faster than the Ego lane. The neighbor lane speed=mean velocity of all vehicles in the lane next to Ego that is within distance 0 to 90 ft (only at a positive distance in the lane, not behind) (at the current time). The Ego lane speed is the speed of the preceding vehicle (current time). The Neighbor lane speed>ego lane speed (left/right). Next, the given classifier is implemented, and at task 830, the layer (a vector of nodes) that has received the highest score with respect to its semantics content (i.e., L*=trajectory encoding layer via the human expert). The L*is computed for the optimal layer to extract semantics. For example, in the given classifier, Not implemented for categories can be (e.g., all categories in W0 related to pedestrian, animal crossing . . . could be named "VRUs"), so using this new category in W1, the explanation will refer to VRUs and not to a specific category. Also, an option task 840 may be implemented to determine W1 from w0 for possible abstractions. At task 850, the explainable model of the explainable classifier is constructed and trained with new connections. At task 860, the validation sample set is received to compute explanations with accuracy measures. At task 870, the new sample is computed with an output explanation. The trained semantic model may output explanations such as: "Left lane change because left lane is faster than mine," "Brake because cut in from the right," "Brake because of lane slow down," and "Normal Driving because road is open."

In the exemplary table below of the W0, the number of occurrences in the training set and the number of occurrences in the test set of the explainable learning system in accordance with an embodiment is shown.

| W0 | Number of occurrences in Training Set | Number of occurrences in Test Set |
| --- | --- | --- |
| Open road | 981621 | 199067 |
| Cut in left | 45472 | 11984 |
| Cut in right | 181363 | 37191 |
| Slowdown | 51534 | 20463 |
| Left lane is faster than mine | 3117826 | 806516 |
| Right lane is faster than mine | 3048345 | 818220 |

In the exemplary table below of the W0, explanation accuracy and explanation ROC AUC of the explainable learning system in accordance with an embodiment is shown.

| W0 | Explanation Accuracy | Explanation ROC AUC |
| --- | --- | --- |
| Open road | 0.940 | 0.987 |
| Cut in left | 0.744 | 0.752 |
| Cut in right | 0.721 | 0.791 |
| Slowdown | 0.867 | 0.944 |
| Left lane is faster than mine | 0.787 | 0.866 |
| Right lane is faster than mine | 0.776 | 0.849 |

The exemplary list of events, below, of the second domain was given together with the original CNN that predicts the comfort of users while experiencing a simulated automated driving ride (see reference Adaptive Driving Agent in Proceedings of the 8$^{th}$ international conference on human agent interaction, Goldman et al 2020). The semantic language W0 used by the explainable classifier is built upon these labels, and it includes 8 categories: traffic, bicycle, pedestrian, open road, cut in, hazard, dense traffic, and jaywalker. In this first example, attention is directed to showing the feasibility of the approach to each of the categories and can note that these categories are supersets of the events already existing in the input features of the comfort prediction CNN. The explainable learning system can enable manual annotation of the language to label the training data set in the explainable CNN in the above table.

a. Approaching a traffic jam
    b. Hazard on road
    c. Driving in a dense traffic scenario
    d. Jaywalker
    e. Pedestrian crossing
    f. Other cars merging in our lane
    g. Bikers
    h. Driving next to biker
    i. Driving in a jam
    j. Open road
    k. Other cars passing us In the explainable learning system, the centroid of activation is computed for Layers L within W0 of the explainable learning system in accordance with an embodiment. The explainable learning system defines a set of semantic categories W0, labels each training sample with the categories in W0, computes the centroid of activations for layers L and W in W0, computes layer L in the classifier with a maximal semantic accuracy of $$\overrightarrow{A_{L,w}} = \frac{1}{|\{x \mid x \in w\}|} \sum_{x \in w} activation_L(x).$$

In the exemplary table, results are illustrated of the classifier computed test Layer with maximal semantic accuracy of the explainable learning system in accordance with an embodiment. The centroids semantic accuracy is determined for W0={traffic, bicycle, pedestrian, open road, cut in, hazard, dense, jay walker}.

| Test Layer | Semantic Accuracy |
|---|---|
| input | 0.942 |
| max_pooling1d_1 | 0.716 |
| max_pooling1d_2 | 0.742 |
| max_pooling1d_3 | 0.386 |
| dense_1 | 0.242 |
| dense_2 | 0.139 |
| dense_3 | 0.137 |

To compute layer L in the classifier with maximal semantic accuracy is as follows: Given a test-set labeled with semantic ground truth (W), the $$\text{semantic accuracy}(L) = \sum_{i=1}^{N} f_L(W_i)/N$$

$$f_L(W_i) = \begin{cases} 1, & \text{activation}_L \text{ (test sample } i\text{) is closest to } \overrightarrow{A_{L,w_i}} \\ 0, & \text{otherwise} \end{cases}$$

is used to find the layer in the classifier that performs best for W0: L*=argmax (semantic accuracy (L)).

Using the centroids computation of the explainable learning system for selection of L*=max_pooling1d_2 in the test layer of FIG. 6. The Semantic accuracy=1 If a semantic class is predicted* correctly (disregarding comfort element) and 0 Otherwise. *Predicted means that the test sample was close enough to the centroid, computed from all training samples of the same.

Figure 9:
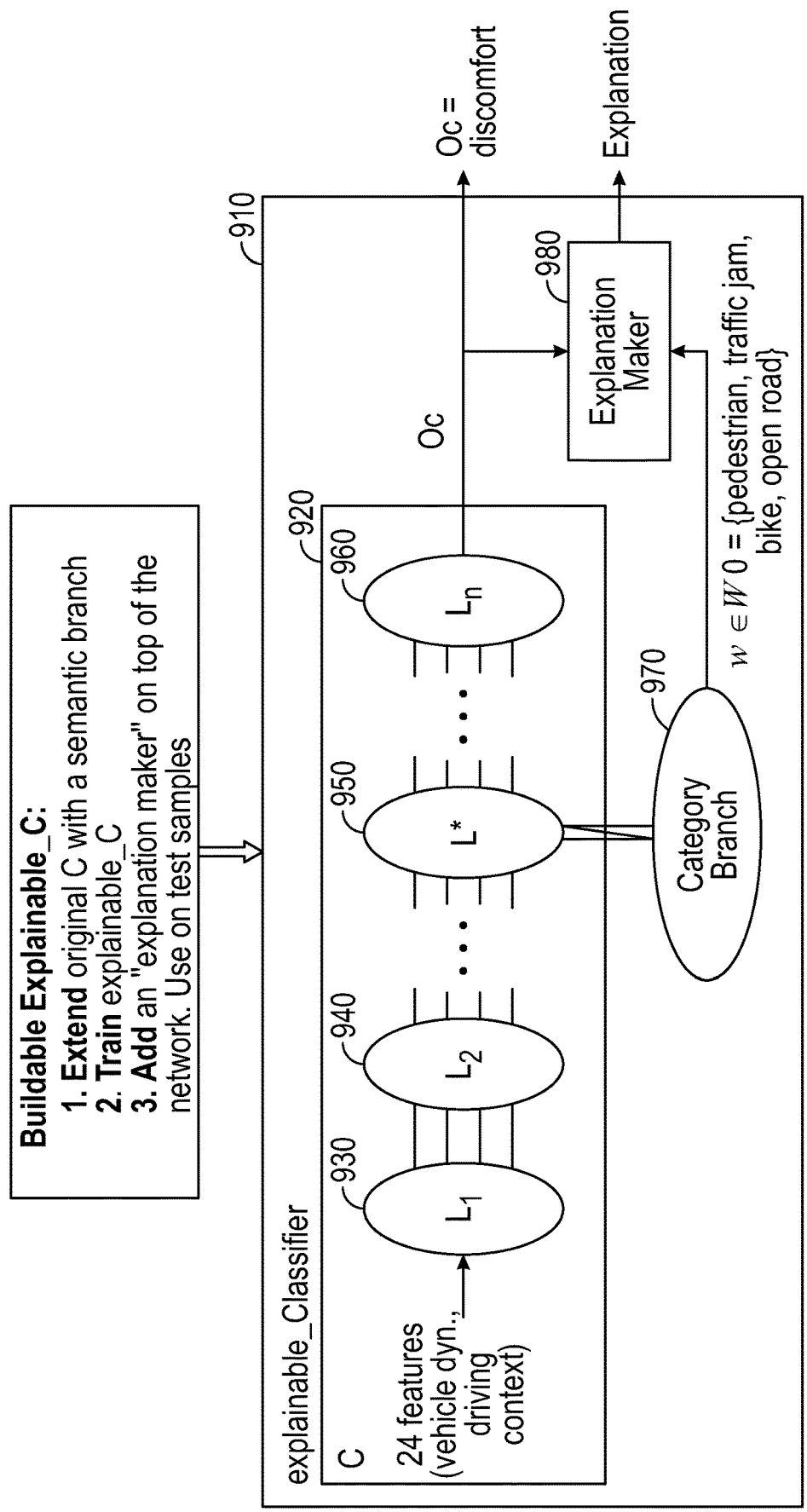
FIG. 9 is an exemplary diagram of the CNN for driving comfort prediction of the explainable learning system in accordance with an embodiment.

FIG. 9 is an exemplary diagram of the CNN for driving comfort prediction of the explainable learning system in accordance with an embodiment. In FIG. 9, the buildable classifier extends the original classifier with a semantic branch connected to layer L*that will predict the corresponding category in W0.

The exemplary table of the explanation accuracy of the explainable learning system in accordance with an embodiment is shown below. It is shown in the table below the measure computed for all layers (not only for L*, the optimal one). The table below shows all the final results. In this domain, as mentioned before, some of the semantic information was part of the input features. Therefore, the input got the highest accuracy score. However, it is seen that even though the original classifier was trained to predict comfort, the layer L*has performed successfully in explaining the semantics, the explainable learning system defines in W0 for the predictions computed by the original CNN. Examples of explanation outputs computed by the explainable CNN include the following: "User is uncomfortable because of traffic" (when the rest of the input settings show a very slow speed due to a traffic jam), "User is uncomfortable because of jaywalker" (when a jaywalker occurred and also the speed of the vehicle was relatively high at that point), "User is uncomfortable because of cut-in" (the vehicle speed was not too high but the distance to the preceding car while another one was passing it was very short).

| L* | Explanation Accuracy |
|---|---|
| input | 1.0 |
| max_pooling1d_1 | 0.999 |
| max_pooling1d_2 | 0.984 |
| max_pooling1d_3 | 0.863 |
| dense_1 | 0.395 |
| dense_2 | 0.243 |
| dense_3 | 0.237 |

In the explanation accuracy for semantic output (SO) and original semantic ground truth (SGT) of a sample S:

$$\text{The explanation Accuracy} = \frac{\sum_{s=1}^{test\,size} g(SO_s, SGT_s)}{test\,size}$$

$$g(SO_s, SGT_s) = \begin{cases} 1, & \text{if } SOT_s = SGT_s \\ 0, & \text{otherwise} \end{cases}$$

The number of training samples is 72,432 and the number of test samples is 18059. There is seen that selecting max_pooling1d_2 is a good approximation to the real optimum. For Layer L*=max_pooling1d_1 and Layer L*=max_pooling1d_2 the accuracy is very close to 1.0. This may be as a result of the inputs contains the semantic class itself.

In a second example (See Deo N. and Trivedi M. 2018 of Convolutional Social Pooling for Vehicle Trajectory Prediction. In Proceedings of the IEEE Conference on Computer Vision and Pattern Recognition (CVPR) Workshops), the Convolutional Social Pooling includes a system and input of 3 seconds (X, Y) tracks of all vehicles at a distance of maximum 1 lane and 90 ft from the ego vehicle. The output is an Ego vehicle's predicted (X, Y) location in the next 5 seconds, and the Ego vehicle's maneuver of Longitudinal={normal driving, bake} and Lateral={keep lane, left lane change, right lane change}.

FIG. 9 is an exemplary diagram 910 of the explainable CNN for trajectory predictions of the explainable learning system in accordance with an embodiment. FIG. 9, explainable classifier 920 composed of layers $L_1$ (930), $L_2$ (940), L*(950), and $L_n$(960) defines the set of semantic categories (via category branch 970) of W0 of W0={Open-road, Cut-in-left, Cut-in-right, Slowdown, Left-lane-faster, Right-lane-faster}. The functions for each category to train the model (for output by the explanation maker 980) are: (1) Open Road: (from HV to preceding vehicle), Distance headway >90 ft; (2) Cut in (left/right) (inside 90 ft inside 4 secs interval limitation of paper), Ego lane should stay the same, and Ego-preceding ID changes and the road is not open, Left/right based on the previous lane id of new preceding; (3) Slowdown: 2 frames are the Ego lane ID does not change, and Ego is not stopped, Ego-preceding ID is not null, Ego-preceding ID is the same in the 2 frames, and it is not stopped, Time headway between Ego and Ego-preceding has decreased. The gap reduced by >0.15*old gap, the road is not open in the 2 frames; (4) The Neighbor lane is faster than Ego lane: Neighbor lane speed=mean velocity of all vehicles in the lane next to Ego that is within distance 0 to 90 ft (only at a positive distance in the lane, not behind) (at the current time), Ego lane speed is the speed of the preceding vehicle (current time), Neighbor lane speed>ego lane speed (left/right).

The CNN of the explainable learning system is configured to predict whether a vehicle is about to make a left lane change, a right lane change, keep its current lane, and if it is going to brake. The explainable learning system makes the assumption that the CNN classifier is given in advance and predicts the vehicle behavior in the next 5 seconds based on data from the previous 3 seconds. It applies the five steps of the process in FIG. 5 to explain the predictions. In this domain, the explainable learning system defines a semantic language W0 with semantic categories that were not included in the data sets of the original classifier. For this matter, the computed 6 semantic categories: open-road cut-in-left, cut-in-right, slowdown, left-lane-faster, right-lane-faster. Each such category required a computation over the settings in the data available to us, but none of the categories were originally used for the prediction learning. The explainable learning system labels the training set for the explainable CNN with these categories. In this domain, it was clear by applying user expert knowledge that extending the CNN at the trajectory encoding layer is a reasonable decision.

In various exemplary embodiments, the explainable learning system computes explanations with the explainable classifier. For example, it can explain that a left lane change was predicted because the left lane is faster than the current lane of the ego vehicle: "Brake because cut in from the right," "Brake because lane slowdown," "Normal driving because road is open."

In this domain, the explanation maker component of the explainable CNN architecture was composed of a binary multi label vector associating a 1 when the corresponding category is true or 0 otherwise. The vector [open road/not open road, cut in left/no cut in left, cut in right/no cut in right, slowdown/no slowdown, left lane faster than ours/ slower or equal, right lane faster than ours/slower or equal]. Therefore, this architecture, can lead to more complex explanations expressed by the combination of several categories. For example, it could extend the explanation maker to provide contrastive explanations such as "brake because cut in from right and not lane slowdown," "left lane change because left lane is faster and not because another vehicle is cutting me in," "left lane change because left lane is faster, slowdown in my lane and vehicle cutting in". The explainable learning system enables multiple explanations in one explanations, as well as contrastive explanations.

In various exemplary embodiments, the present disclosure presents a methodology deemed to enable extending given classifiers, training the classifiers, and evaluating the classifiers to produce explanations of the original predictions. The explainable learning system is implemented to illustrate the benefits of such semantic explanations in two domains: comfort driving and driving trajectories. In the first one, the explainable learning system explains, why the classifier predicted that a user would feel comfortable or not given a certain driving style. The semantic reasons provided by the explainable classifier included traffic jams, pedestrians, bikers, and jaywalkers. In the second domain, the explainable classifier explains why a vehicle was predicted to make lane changes or keep their current lane or brake. The explanations include other vehicles cutting in, traffic to be faster or not in the adjacent lanes, and traffic building up on the same lane producing slowdowns. In this domain, it was also shown that the explanations included contrastive reasons, since it can be shown that one semantic reason applied while another one did not (for example, a slowdown could be shown to be due to traffic building up and not because a vehicle is cutting in).

The present disclosure in various exemplary embodiments provides value at the intersection of learning models and model-based planning work. Explaining the semantics of black boxes can be transferred to a model-based planner to assist in choosing higher value actions. The results may also be deemed relevant in supporting human users' understanding of advanced features computed by AI systems.

The various tasks performed in connection with supervised learning and training of the explainable learning model may be performed by software, hardware, firmware, or any combination thereof. In practice, portions of the process of FIGS. 1-9 may be performed by different elements of the described system.

It should be appreciated that process of FIGS. 1-9 may include any number of additional or alternative tasks, the tasks shown in FIGS. 1-9 need not be performed in the illustrated order, and process of the FIGS. 1-9 may be incorporated into a more comprehensive procedure or process having additional functionality not described in detail herein. Moreover, one or more of the tasks shown in FIGS. 1-9 could be omitted from an embodiment of the process shown in FIGS. 1-9 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least two exemplary embodiments have been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for constructing an explainable user output for control of a vehicle, the method comprising:
receiving input data for the vehicle of a set of features for processing at a neural network (NN) that is stored within a non-transitory computer readable storage medium of the vehicle, wherein the neural network is composed of a plurality of layers of an original classifier, wherein the original classifier has been frozen with a set of weights;
determining, via a processor of the vehicle, a semantic function to categorize a data sample with a semantic category;
determining, via the processor of the vehicle, a level of semantic accuracy for each layer of the plurality of layers of the original classifier within the neural network wherein the original classifier is a trained model;

computing, via the processor of the vehicle, a representative vector with average activations of a layer's nodes of the plurality of layers for training samples of a semantic category determined for evaluation by computing distances of samples in a test set from available layers for each semantic category;

computing, via the processor of the vehicle, a number of test samples for each layer and for each semantic category of a plurality of semantic categories, that are closest to each other in each layer, to designate a layer with a highest score representative of a best semantics in each test sample of a set of test sample processed;

extending, via the processor of the vehicle, a designated layer of the plurality of layers by a category branch to the NN to extract semantic data samples of the semantic content, and for an explainable classifier in the extension of the NN for defining a plurality of semantic categories determined by the NN;

training, via the processor of the vehicle, a set of connections of the explainable classifier of the NN to compute a set of output explanations with an accuracy measure associated with each output explanation based on at least one semantic category of the plurality of semantic categories;

comparing the accuracy measure for each output explanation based on an extracted semantic data sample by the trained explainable classifier for each semantic category to generate an output explanation in a user understandable format;

automatically controlling movement of the vehicle, via the processor, based on the input data and the neural network; and providing, via the processor, an output for a user of the vehicle that includes an explanation of the controlling of the movement of the vehicle, using the output explanation.

2. The method of claim 1, further comprising:
computing multiple explanations as outputs; and
computing counterfactual explanations of composed explanations wherein the designated layer is an optimal semantic content layer.

3. The method of claim 2, further comprising:
configuring the explainable classifier with the plurality of layers wherein each layer is configured with a set of weights;
labeling an extracted input data sample of the explainable classifier with a set of defined semantic categories associated with the optimal semantic content layer;
computing a centroid of activation for each layer of the plurality of layers of the explainable classifier; and
computing based on the centroid of activation, the layer of the explainable classifier with maximal semantic accuracy.

4. The method of claim 3, further comprising:
computing the maximal semantic accuracy based on the semantic function and optionally a redefined semantic function for each semantic category of the set of semantic categories.

5. The method of claim 4, further comprising:
designating at least one layer of the plurality of layers of the original classifier based on the amount of computed semantic accuracy by running an input data sample through each layer of the original classifier to observe a number of activations of nodes contained each layer;

determining a set of distances between each node activation of a node layer for each sample and an average of node activations in a corresponding node layer for all data samples in a training set for each semantic category;

repeating the determining step for each consecutive input data sample until an average vector value for each layer's node is computed in each layer for each received input data sample and for each semantic category;

retaining the average vector value for each node in each layer of the plurality of layers of the original classifier;

scoring in each layer of the plurality of layers, an average of nodes in vectors wherein the average of nodes is configured as a vector;

summing a set of scores of vector values for each layer of the plurality of layers that are received for all of data samples in a data set wherein the scored vector values in each layer are used to determine a layer with a maximum value; and designating the layer of the plurality of layers with the maximum value as the optimal semantic content layer.

6. The method of claim 1, wherein the neural network comprises a convoluted neural network (CNN), and the neural network comprises an extension of the CNN.

7. The method of claim 6, further comprising:
extending for the explainable classifier by extension of the NN for driving comfort by extending the original classifier to extract semantic content via the designated layer to predict semantic categories corresponding to a feature set of vehicle dynamics and vehicle control.

8. The method of claim 7, further comprising:
training a set of connections of the extension of the NN of the explainable classifier for driving comfort while a set of weights of the original classifier is frozen; and
adding an explanation maker to an output of the extension of the NN to associate with data samples of the extracted semantic content;
wherein the step of providing the output comprises providing, via the processor, the output for the user of the vehicle, the output further including an explanation of the driving comfort.

9. The method of claim 6, further comprising:
extending for the explainable classifier for trajectory predictions by extending the original classifier to extract semantic content via the designated layer to predict semantic categories associated with a semantic feature set comprising sample data of convolution social pooling.

10. The method of claim 9, further comprising:
training a set of connections of the explainable classifier for trajectory planning; and
adding an explanation maker to an output to associate with data samples of the semantic feature set comprising sample data of convolution social pooling.

11. A system for constructing an explainable user output for control of a vehicle, the system comprising:
a processor of the vehicle, the processor configured to receive input data for the vehicle to process a set of features at a neural network that is stored within a non-transitory computer readable storage medium of the vehicle, wherein the neural network is composed of a plurality of layers of an original classifier wherein the original classifier has been frozen with a set of weights related to features of the input data;
the processor configured to determine a semantic function to categorize a data sample with a semantic category, and to determine a level of semantic accuracy for each layer of the plurality of layers of the original classifier within the neural network wherein the original classifier is a trained model;

the processor configured to compute a representative vector with average activations of each layer's nodes of the plurality of layers for training a set of samples of a semantic category to evaluate by computation of distances of each sample in a test set composed of a set of samples from available layers of the plurality of layers for each semantic category of a set of semantic categories;

the processor configured to compute a number of test samples for each layer of the plurality of layers and for each semantic category, that are closest to each other in each layer in the plurality of layers, to designate a layer of the plurality of layers with a highest score representative of a best semantics in each test samples wherein a designated layer is an optimal semantic content layer;

the processor configured to extend the optimal semantic content layer by a category branch to the neural network to extract a set of semantic data samples from the semantic content of the original classifier to the neural network, and to extend with an extension the explainable classifier of the neural network to define a plurality of semantic categories;

the processor configured to train a set of new connections of an explainable classifier of the neural network to compute a set of output explanations that are composed of explanations with an accuracy measure associated each output explanation based on at least one semantic category of the plurality of semantic categories;

the processor configured to compare the accuracy measure for each output explanation based on an extracted semantic data sample by the trained explainable classifier for each semantic category of the plurality of semantic categories and to generate the output explanation in a user understandable format;

the processor configured to automatically control movement of the vehicle based on the input data and the neural network; and the processor configured to provide an output for a user of the vehicle that includes an explanation of the controlling of the movement of the vehicle, using the output explanation.

12. The system of claim 11, further comprising:
the processor configured to compute multiple explanations as outputs and counterfactual explanations of composed explanations.

13. The system of claim 12, further comprising:
the processor configured to:
apply the explainable classifier with the plurality of layers wherein each layer is configured with a set of weights;
label an extracted input data sample by the explainable classifier with a set of defined semantic categories associated with the optimal semantic content layer;
compute a centroid of activation for each layer of the plurality of layers of the explainable classifier; and
compute based on the centroid of activation, the layer of the plurality of layers of the explainable classifier with maximal semantic accuracy.

14. The system of claim 13, further comprising:
the processor configured to:
compute the maximal semantic accuracy based on a semantic function and optionally by a redefined semantic function for each semantic category of the defined set of semantic categories wherein the redefined semantic function provides more abstract semantic categories.

15. The system of claim 14, further comprising:
the processor configured to:
designate at least one layer of the plurality of layers of the original classifier based on the amount of computed semantic accuracy by processing an input data sample of a set of input data samples through each layer of the plurality of layers of the original classifier to determine the number of activations of nodes contained each layer;
in response to a determination of the number of node activations, determining a set of distances between each node activation of a node layer of the plurality of layers for each sample and an average of node activations in corresponding node layer for all data samples in the set of input data samples in a training set for each semantic category of the plurality of semantic categories;
repeat the determining for each consecutive input data sample until an average vector value for each layer's node is computed in each layer for each received input data sample;
retain the average vector value for each node in each layer of the plurality of layers of the original classifier;
score, in each layer of the plurality of layers, an average of nodes in vectors wherein the average of nodes is configured as a vector;
sum, a set of scores of vector values for each layer of the plurality of layers that is received for all of the data samples in a data set wherein the scored vector values in each layer are used to determine a layer with a maximum value; and
designate the layer of the plurality of layers with the maximum value as the optimal semantic content layer.

16. The system of claim 15, further comprising:
the processor configured to:
extend for the explainable classifier by extension of the neural network (NN) for driving comfort by extension of the original classifier to an extended architecture to extract semantic content via the designated layer of the plurality of layers to predict semantic categories corresponding to a feature set of vehicle dynamics and vehicle control;
train only the set of weights of the new connections from an original CNN to the extended architecture wherein the set of weights of the original CNN trained for driving comfort are kept frozen;
add an explanation maker to an output of the NN to associate with the data samples associated with the extracted semantic content; and
provide the output for the user of the vehicle, the output further including an explanation of the driving comfort.

17. The system of claim 16, further comprising:
the processor configured to:
extend for an explainable classifier for trajectory predictions by extension of the original classifier to extract semantic content via the designated layer to predict a semantic category of the plurality of semantic categories associated with a feature set comprising sample data of convolution social pooling;
train only the weights of the new connections from the original classifier to the extended architecture wherein the set of weights of the original classifier trained for predicting driving trajectories are kept frozen; and add an explanation maker to an output of the NN to associate with the data sample of the set of data samples associated with the feature set comprising sample data of convolution social pooling.

18. A vehicle comprising:

a propulsion system;

a non-transitory computer readable storage medium storing a neural network (NN); and at least one processor of a vehicle that is deployed in the vehicle, the at least one processor coupled to the propulsion system and to the non-transitory computer readable storage medium, the at least one processor programmed to:

receive input data for the vehicle of a set of a plurality of features for processing at the neural network (NN), wherein the neural network (NN) comprises one of a convoluted neural network (CNN) which is composed of a plurality of layers of an original classifier wherein the original classifier has been frozen with a set of weights related to features of the input data;

determine a semantic function of a plurality of semantic functions to categorize a data sample with a semantic category;

determine a level of semantic accuracy for each layer of the plurality of layers of the original classifier within the neural network wherein the original classifier is a trained model;

compute a representative vector with average activations of each layer's nodes of the plurality of layers for training samples of a semantic category for evaluation by computing distances of samples in a test set from available layers for each semantic category;

compute a number of test samples of a set of test samples for each layer and for each semantic category, that are closest to each other in each layer, to designate a layer of the plurality of layers with a highest score representative of a best semantics in each test samples;

redefine the semantic function to change the semantic accuracy to generate more semantic content in determining the semantic accuracy of each layer of the original classifier by the trained model wherein the redefinition of the semantic function is an optional step to provide more abstract semantic categories;

extend a designated layer by a category branch of the neural network to extract semantic data samples derived from the semantic content to the extension of the neural network, and to extend an explainable classifier of the neural network to define a plurality of semantic categories;

train a set of connections of the explainable classifier of the neural network to compute a set of output explanations with an accuracy measure associated each output explanation based on at least one semantic category of the plurality of semantic categories wherein the output explanations are well defined syntactic sentences;

compare the accuracy measure for each output explanation based on an extracted semantic data sample by the trained explainable classifier for each semantic category to generate the output explanation in a user understandable format;

automatically control movement of the vehicle based on the input data and the neural network; and provide an output for a user of the vehicle that includes an explanation of the controlling of the movement of the vehicle, using the output explanation.

19. The apparatus of claim 18, further comprising:

the at least one processor programmed to:

configure the explainable classifier with a plurality of layers wherein each layer is configured with a set of weights;

label an extracted input data sample of the explainable classifier with a set of defined semantic categories of the plurality of semantic categories;

associate the set of defined semantic categories with an optimal semantic content layer;

compute a centroid of activation for each layer of the plurality of layers of the explainable classifier; and compute based on the centroid of activation, the layer of the plurality of layers of the explainable classifier with maximal semantic accuracy.

20. The apparatus of claim 19, further comprising:

the at least one processor programmed to:

compute the maximal semantic accuracy based on the redefined semantic function with inclusion of a redefined semantic category for the set of semantic categories composed of a plurality of semantic categories; and create the output explanation in the user understandable format with the use of the redefined semantic category.

* * * * *